US012755541B2

(12) United States Patent
Monteuuis et al.

(10) Patent No.: US 12,755,541 B2
(45) Date of Patent: Oct. 6, 2026

(54) TRACKER-BASED SECURITY SOLUTIONS FOR CAMERA SYSTEMS

(71) Applicant: QUALCOMM Incorporated, San Diego, CA (US)

(72) Inventors: Jean-Philippe Monteuuis, Northborough, MA (US); Jonathan Petit, Wenham, MA (US); Mohammad Raashid Ansari, Saugus, MA (US); Dashan Gao, San Diego, CA (US); Leulseged Tesfaye Alemu, San Diego, CA (US); Cong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 18/470,924

(22) Filed: Sep. 20, 2023

(65) Prior Publication Data

US 2025/0095373 A1 Mar. 20, 2025

(51) Int. Cl.
*G06V 20/52* (2022.01)
*G06T 7/00* (2017.01)
(Continued)

(52) U.S. Cl.
CPC ............ *G06V 20/52* (2022.01); *G06T 7/0002* (2013.01); *G06T 7/70* (2017.01); *G06V 10/761* (2022.01); *G06V 10/764* (2022.01)

(58) Field of Classification Search
CPC .... G06V 20/52; G06V 10/761; G06V 10/764; G06T 7/0002; G06T 7/70; H04L 63/1416; H04L 63/1466; H04L 67/12; H04W 4/40
See application file for complete search history.

(56) References Cited

U.S. PATENT DOCUMENTS

| | | | | |
|---|---|---|---|---|
| 10,733,718 | B1 * | 8/2020 | Lerman | G06T 7/55 |
| 2020/0151505 | A1 * | 5/2020 | Saito | G06F 18/214 |

(Continued)

OTHER PUBLICATIONS

U.S. Appl. No. 18/528,445, filed in the USPTO on Dec. 4, 2023, 94 pages, Assignee: Qualcomm Incorporated.

(Continued)

*Primary Examiner* — John B Strege
(74) *Attorney, Agent, or Firm* — Polsinelli LLP

(57) ABSTRACT

Various embodiments include methods for identifying inconsistencies in images that could be due to malicious attacks. Various embodiments may include receiving a plurality of camera images from one or more cameras of an apparatus (e.g., a vehicle), performing a plurality of different processes on the plurality of images to detect different types of image inconsistencies, using results of the plurality of different processes on the plurality of images to recognize a vision attack and performing one or more mitigation actions in response to recognizing a vision attack. The plurality of different processes may include temporal consistency checks on the plurality of images spanning a period of time, inconsistency counter checks on the plurality of images that determine whether a number of inconsistencies in camera images satisfies a threshold, past history checks on the plurality of images comparing objects previously recognized to objects recognized in currently obtained images.

23 Claims, 11 Drawing Sheets

(51) Int. Cl.

| | |
|---|---|
| ***G06T 7/70*** | (2017.01) |
| ***G06V 10/74*** | (2022.01) |
| ***G06V 10/764*** | (2022.01) |

(56) References Cited

U.S. PATENT DOCUMENTS

| | | | | |
|---|---|---|---|---|
| 2021/0181757 | A1 | 6/2021 | Goel et al. | |
| 2021/0185067 | A1* | 6/2021 | Sureda | H04L 63/1416 |
| 2021/0248241 | A1* | 8/2021 | Balkanski | G06V 20/95 |
| 2021/0287387 | A1 | 9/2021 | Deegan et al. | |
| 2022/0036126 | A1* | 2/2022 | Gaidon | G06V 20/56 |
| 2022/0318570 | A1* | 10/2022 | Soryal | G06V 10/82 |
| 2023/0015771 | A1 | 1/2023 | Nassi et al. | |
| 2023/0343108 | A1 | 10/2023 | Hemantharaja | |
| 2024/0161333 | A1 | 5/2024 | Milioris | |
| 2024/0233328 | A1 | 7/2024 | Hofman et al. | |
| 2024/0331449 | A1* | 10/2024 | Cintas | G06V 10/774 |
| 2024/0371134 | A1* | 11/2024 | Avraham | G06V 10/82 |
| 2025/0028821 | A1 | 1/2025 | Koseki | |
| 2025/0181711 | A1 | 6/2025 | Monteuuis et al. | |

OTHER PUBLICATIONS

B. Nassi et al., "Enabling object detectors to better distinguish between real and fake objects in semi-autonomous and fully autonomous vehicles", Communications of the ACM | Apr. 2023 | vol. 66 | No. 4, 12 pages.

Ka-Ho Chow, "Robust Object Detection Fusion Against Deception" KDD '21, Aug. 14-18, 2021, Virtual Event, Singapore, 11 pages.

Man et al., "That Person Moves Like A Car: Misclassification Attack Detection for Autonomous Systems Using Spatiotemporal Consistency", Univ. of Arizone, Purdue Univ and Virginia Tech; Man, Y., Muller, R., Li, M., Celik, Z. B., & Gerdes, R. in USENIX Security Symposium, pp. 1-18, 2023.

International Search Report and Written Opinion—PCT/US2024/045872—ISA/EPO—Nov. 26, 2024.

Man Y., et al., "Remote Perception Attacks against Camera-based Object Recognition Systems and Countermeasures", ACM Transactions on Cyber-Physical Systems, ACM, 2 Penn Plaza, Suite 701, New York NY, 10121-0701 USA, May 17, 2023, pp. 1-26, XP059176771, Sections 7.1-7.4.

Man Y., et al., "That Person Moves Like a Car: Misclassification Attack Detection for Autonomous Systems Using Spatiotemporal Consistency", USENIX, The Advanced Computing Systems Association, 19 Pages, Aug. 15, 2023, pp. 1-19, XP061082880, Sections 2.1-5.2.

International Search Report and Written Opinion—PCT/US2024/056749—ISA/EPO—Feb. 3, 2025.

Man Y., et al., "That Person Moves Like a Car: Misclassification Attack Detection for Autonomous Systems Using Spatiotemporal Consistency", Usenix, Usenix, the Advanced Computing Systems Association Aug. 15, 2023, 19 Pages, XP061082880, Sections 4.1 and 4.2; figure 3.

Nassi B., et al., "Protecting Autonomous Cars from Phantom Attacks", ARXIV:2003.08934V1, United States, vol. 66, No. 4, Mar. 23, 2023, pp. 56-69, XP059332051, p. 62, Right-hand Column—p. 64, Left-hand Column, figure 5.

Nesti F., et al., "Evaluating the Robustness of Semantic Segmentation for Autonomous Driving Against Real-World Adversarial Patch Attacks", arXiv:2108.06179v1 [cs.CV], Cornell University Library, 201 Olin Library Cornell University Ithaca, NY 14853, pp. 1-10, Aug. 13, 2021, XP091035148, Abstract, Section 3, Section 4.

* cited by examiner

TRACKER-BASED SECURITY SOLUTIONS FOR CAMERA SYSTEMS

BACKGROUND

With the advent of autonomous and semi-autonomous vehicles, robotic vehicles, and other types of mobile apparatuses that use advanced driver assistance systems (ADAS) and autonomous driving systems (ADS), apparatuses with such systems are becoming vulnerable to a new form of malicious behavior and threats; namely spoofing or otherwise attacking the camera systems that are at the heart of autonomous vehicle navigation and object avoidance. While such attacks may be rare presently, with the expansion of apparatuses with autonomous driving systems, it is expected that such attacks may become a significant problem in the future.

SUMMARY

Various aspects include methods that may be implemented on a processing system of an apparatus and systems for implementing the methods for identifying and reacting to inconsistencies in images that could be due to malicious attacks. Various aspects may include receiving a plurality of images from one or more cameras of the apparatus, performing a plurality of different processes on the plurality of images to detect different types of image inconsistencies, using results of the plurality of different processes on the plurality of images to recognize a vision attack, and performing one or more mitigation actions in response to recognizing a vision attack.

In some aspects, performing the plurality of different processes on the plurality of images to detect different types of image inconsistencies may include performing temporal consistency checks on the plurality of images spanning a period of time. In some aspects, performing the plurality of different processes on the plurality of images to detect different types of image inconsistencies may include performing inconsistency counter checks on the plurality of images that determine whether a number of inconsistencies in images satisfies a threshold.

In some aspects, performing the plurality of different processes on the plurality of images to detect different types of image inconsistencies may include performing a past history check on the plurality of images comparing objects previously recognized in previously processed images to objects recognized in currently obtained images to recognize a change in at least one of an object, a location of an object, or a classification of an object. In some aspects, using results of the plurality of different processes on the plurality of images may include one or more of: recognizing a vision attack if any one of the different types of image inconsistencies is detected, recognizing a vision attack if a number of the different types of image inconsistencies that are detected exceeds a threshold, recognizing a vision attack if a majority of detectors detect image inconsistencies, or recognizing a vision attack if a weighted majority of detectors detect image inconsistencies, in which weights applied to each of the different detectors are predetermined.

In some aspects, performing a mitigation action in response to recognizing a vision attack may include one or more of removing a malicious track from a tracking database, outputting an indication of the attack, or disabling a malicious feature associated with an object identified in the images. In some aspects, performing a mitigation action in response to recognizing a vision attack may include reporting the detected attack to a remote system.

Further aspects include an apparatus, such as a vehicle, including a memory and a processor configured to perform operations of any of the methods summarized above. Further aspects may include an apparatus, such as a vehicle having various means for performing functions corresponding to any of the methods summarized above. Further aspects may include a non-transitory processor-readable storage medium having stored thereon processor-executable instructions configured to cause one or more processors of an apparatus processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
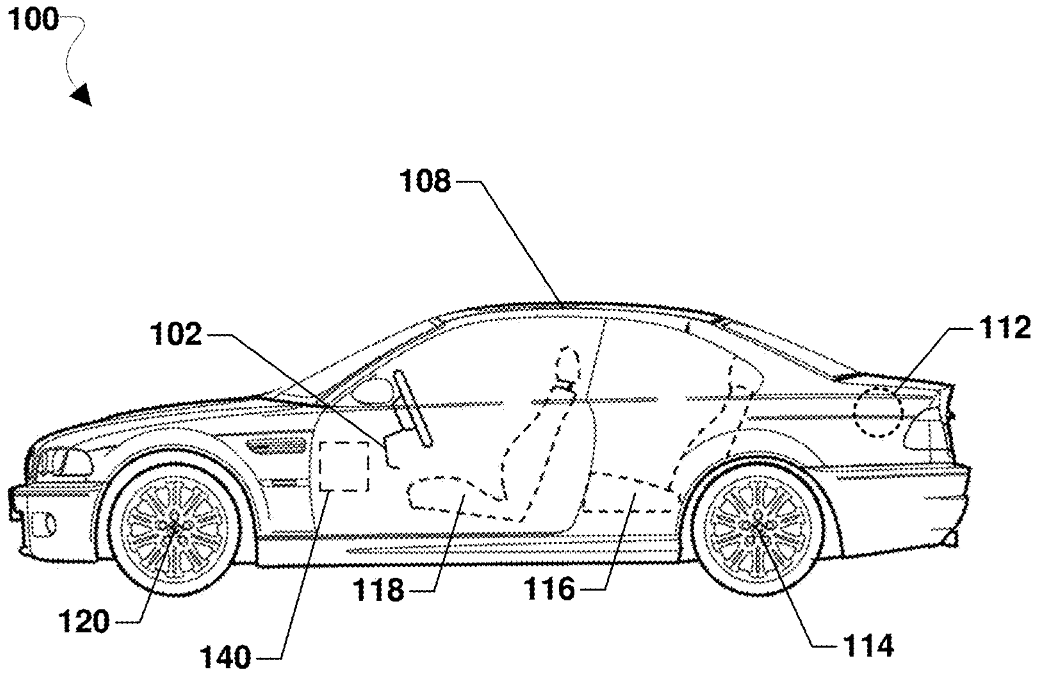
FIGS. 1A-1C are component block diagrams illustrating systems typical of an autonomous apparatus in the form of a vehicle that are suitable for suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the claims.

Various embodiments include methods and vehicle processing systems for identifying and responding to attacks on apparatus (e.g., vehicle) cameras, referred to herein as "vision attacks." Various embodiments address potential risks to apparatuses (e.g., vehicles) that could be posed by malicious vision attacks as well as inadvertent actions that cause images acquired by cameras to appear to include false objects or obstacles that need to be avoided, fake traffic signs, imagery that can interfere with depth and distance determinations, and similar misleading imagery that could interfere with the safe autonomous operation of an apparatus. Various embodiments provide methods for recognizing actual or potential vision attacks based on inconsistencies in the imagery (e.g., unexpected or inappropriate shapes, movements of shapes, changes in objects, etc.) and processing of imagery (e.g., classification, labeling, etc.) among a plurality of images (e.g., multiple image frames from a stream of camera images). Various embodiments may include identifying inconsistencies in a plurality of images that could be due to malicious attacks. In particular, performing a plurality of different types of processes on images received from apparatus cameras to identify or detect different types of image inconsistencies that may provide multiple ways of detecting vision attacks, thus overcoming vulnerabilities in any single detection method and enabling decision mechanisms that can reduce false positive determinations. When a vision attack or likely attack is recognized, some embodiments include the processing system performing one or more mitigation actions to reduce threats due to the attack, outputting an indication of the vision attack, and/or reporting detected attacks to an external third party, such as law enforcement or highway maintenance authorities.

Various embodiments may improve the operational safety of autonomous and semi-autonomous apparatuses (e.g., vehicles)_by providing effective methods and systems for detecting malicious attacks on camera systems, and taking mitigating actions such as to reduce risks to the vehicle, output an indication, and/or report attacks to appropriate authorities.

The terms "onboard" or "in-vehicle" are used herein interchangeably to refer to equipment or components contained within, attached to, and/or carried by an apparatus (e.g., a vehicle or device that provides a vehicle functionality). Onboard equipment typically includes a processing system that may include one or more processors, SOCs, and/or SIPs, any of which may include one or more components, systems, units, and/or modules that implement the functionality (collectively referred to herein as a "processing system" for conciseness). Aspects of onboard equipment and functionality may be implemented in hardware components, software components, or a combination of hardware and software components.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "apparatus" is used herein to refer to any of a variety of devices, system and equipment that may use camera vision systems, and thus be potentially vulnerable to vision attacks. Some non-limiting examples of apparatuses to which various embodiments may be applied include autonomous and semiautonomous vehicles, mobile robots, mobile machinery, autonomous and semiautonomous farm equipment, autonomous and semiautonomous construction and paving equipment, autonomous and semiautonomous military equipment, and the like.

As used herein, the term "processing system" is used herein to refer to one more processors, including multi-core processors, that are organized and configured to perform various computing functions. Various embodiment methods may be implemented in one or more of multiple processors within any of a variety of vehicle computers and processing systems as described herein.

Camera systems and image processing plays a critical role in current and future autonomous and semiautonomous apparatuses, such as autonomous and semiautonomous vehicles, mobile robots, mobile machinery, autonomous and semiautonomous farm equipment, etc. Multiple cameras provide images of the roadway and surrounding scenery, providing data that is useful for navigation (e.g., roadway following), object recognition, collision avoidance, and hazard detection. The processing of image data in modern autonomous systems has progressed far beyond basic object recognition and tracking to include understanding information posted on street signs, understanding roadway conditions, and navigating complex roadway situations (e.g., turning lanes, avoiding pedestrians and bicyclists, maneuvering around traffic cones, etc.).

The processing of camera data fields involves a number of tasks (sometimes referred to as "vision tasks") that are crucial to safe operations of autonomous apparatus, such as vehicles. Among the vision tasks that camera systems typically perform are roadway tracking with depth estimation to enable path planning, object detection in three dimensions (3D), object identification or classification, traffic sign recognition (including temporary traffic signs and signs reflected in map data), and panoptic segmentation. In a modern autonomous driving system, camera images may be processed by a number of different analysis engines, including trained neural network/artificial intelligence (AI) analysis modules that are configured to perform various analysis tasks. Analysis tasks may include decision tasks and segmentation tasks. Segmentation tasks may involve processing image frames to obtain a number of different types of information useful by the autonomous driving system. Decision tasks may involve the processing of a plurality of images by a 3D analysis module that is configured to identify roadway contours and locations of objects positioned along the roadway in 3D, and analyses image frames to identify and interpret objects in real-time, such as understanding the meaning of recognize traffic signs.

One very important operation achieved through processing of image data is object detection and recognition. Examples of objects that should be identified, categorized and in some cases interpreted or understood include traffic signs, pedestrians, other vehicles, roadway obstacles, and roadway features that differ from information included in detailed map data and observed during prior driving experiences.

Traffic signs are a type of object that needs to be recognized, categorized, and displayed writing understood for autonomous vehicle applications so that the guidance and regulations identified by the sign can be included in the decision-making of the autonomous driving system. Typically, traffic signs have a recognizable shape depending upon the type of information that is displayed (e.g., stop, yield, speed limit, etc.). However, sometimes the displayed information differs from the meaning or classification correspondence to the shape, such as text in different languages, observable shapes that are not actually traffic signs (e.g., advertisements, T-shirt designs, protest signs, etc.). Also, traffic signs may identify requirements regulations that are inconsistent with information that appears in map data that the autonomous driving system may be relying upon.

Pedestrians and other vehicles are obviously important objects to recognize, identify or categorize, and track closely to avoid collisions and properly plan a vehicle's path. Categorizing pedestrians and other vehicles may be useful in predicting the future positions or trajectories of those objects, which is important for future planning performed by the autonomous driving system.

To enable such object detection recognition and classification, a plurality of images may be processed through one or more complex processes. Such processes may include receiving input frames from one or more camera systems, and processing individual frames to recognizing important objects within each frame, such as recognizing traffic signs, vehicles, people, and other objects. Certain types of objects, such as traffic signs, pedestrians, and other vehicles, need to be recognized and categorized so that they can be given special recognition processing. When such types of objects are identified in the plurality of images, portions of image frames including the recognize objects may be extracted and buffered in memory so that a track of the objects within the field of view of apparatus cameras can be extracted. This information may be applied to a classifier that performs the function of categorizing the object and obtaining information about or within the object useful for navigating the apparatus. The recognition process may involve the use of a trained neural network/AI recognition model that has been trained on one or more image databases (e.g., a database of traffic sign shapes, a database of vehicle model shapes, a database of animal shapes, etc.) to recognize and classify objects based on features extracted from a series of images. The output of this process may be information that is useful by the autonomous driving system, including the location, classification, and, in the case of traffic signs, information displayed on the object.

In addition to recognizing, classifying and obtaining information regarding detected objects, image data needs to be processed in a manner that allows tracking the location of these objects from frame to frame so that the trajectory of the objects with respect to the apparatus (or the apparatus with respect to the objects) can be determined to support navigation and collision avoidance functions. This processing may also use a trained neural network/AI model that receives image frames and outputs various types of information, such as features, box size, location within the frame (e.g., center offset) and importance or frequency (e.g., a "heat map"). The process of tracking objects from frame to frame may involve the use of an association algorithm that translates information (e.g., size, shape, frame location, color, etc.) regarding bounding boxes and recognized features into a data structure referred to as a "tracklet pool." Using such data structures, the association algorithm may recognize and associate boxes and features that appear in one image frame with boxes and features that appeared in a preceding image frame. In descriptions of some embodiments, this frame-to-frame association process is sometimes referred to as associating features in the "t-th frame" to features in the next or a subsequent frame, referred to as the "(t=1)-th frame," in which t is an arbitrary time within a sequence of image frames.

Vision attacks, as well as confusing or conflicting imagery that could mislead the image analysis processes of autonomous driving systems, can come from a number of different sources and involve a variety different kinds of attacks. Vision attacks may target the semantic segmentation operations, depth estimations, and/or object detection and recognition functions of important image processing functions of autonomous driving systems. Vision attacks may include projector attacks and patch attacks.

In projector vision attacks, imagery is projected upon vehicle cameras by a projector with the intent of creating false or misleading image data to confuse an autonomous driving system. For example, a projector may be used to project onto the roadway an image that, when viewed in the two-dimensional vision plane of the camera, appears to be three-dimensional and resemble an object that needs to be avoided. An example of this type of attack would be a projection onto the roadway of a picture or shape resembling a pedestrian (or other object) that when viewed from the perspective of the vehicle camera appears to be a pedestrian in the roadway. Another example is a projector that projects imagery onto structures along the roadway, such as projecting an image of stop sign on a building wall that is otherwise blank. Another example is a projector aimed directly at the apparatus cameras that injects imagery (e.g., false traffic signs) into the images.

Examples of patch vision attacks include images of recognizable objects, such as traffic signs, that are false, inappropriate, or in places where such objects should not appear. For example, a T-shirt with a stop sign image on it could confuse an autonomous driving system regarding whether the vehicle should stop or ignore the sign, especially if the person wearing the shirt is walking or running and not at or near an intersection. As another example, images or confusing shapes on the back end of a vehicle could confuse the image processing module that estimates depth and 3D positions of objects.

While some methods have been proposed for dealing with image distortions and interference, no comprehensive, multifactored methods have been identified. Thus, camera-based autonomous driving systems remain vulnerable to a number of vision attacks.

Various embodiments provide an integrated security solution to address the threats posed by attacks on apparatus cameras supporting autonomous driving and maneuvering systems. Various embodiments include the use of multiple different kinds of detection methods (referred to as detectors) that can recognize inconsistencies in and across image frames using different techniques. In this manner, the system is able to recognize different types of vision attacks without being vulnerable to limitations of any one of the different methods. Various embodiments include methods that are based on temporal consistency checks (i.e., whether objects or features change dramatically from one frame to the next), inconsistency count checks (i.e., whether the number of detected inconsistencies in a plurality of images exceeds a threshold), and historical consistency checks (i.e., recognizing when a feature that was present in previous travels now appears in or disappears from current images at the same location). Some embodiments include methods of using the detection method results to decide whether inconsistencies in the plurality of images indicate or suggest a possible camera or vision attack. Some embodiments include performing one or mitigation actions to protect the apparatus, such as pruning, deleting or ignoring the suspicious information obtained from image processing to avoid misleading an autonomous driving system. Some embodiments include reporting information about a detected vision attack to a third party, such as an authority that can take an action to remove or suppress the attack or source of image inconsistencies. Some embodiments may include outputting an indication of a vision attack, such as indicating such an attack in a display or announcement to an operator.

Figure 1B:
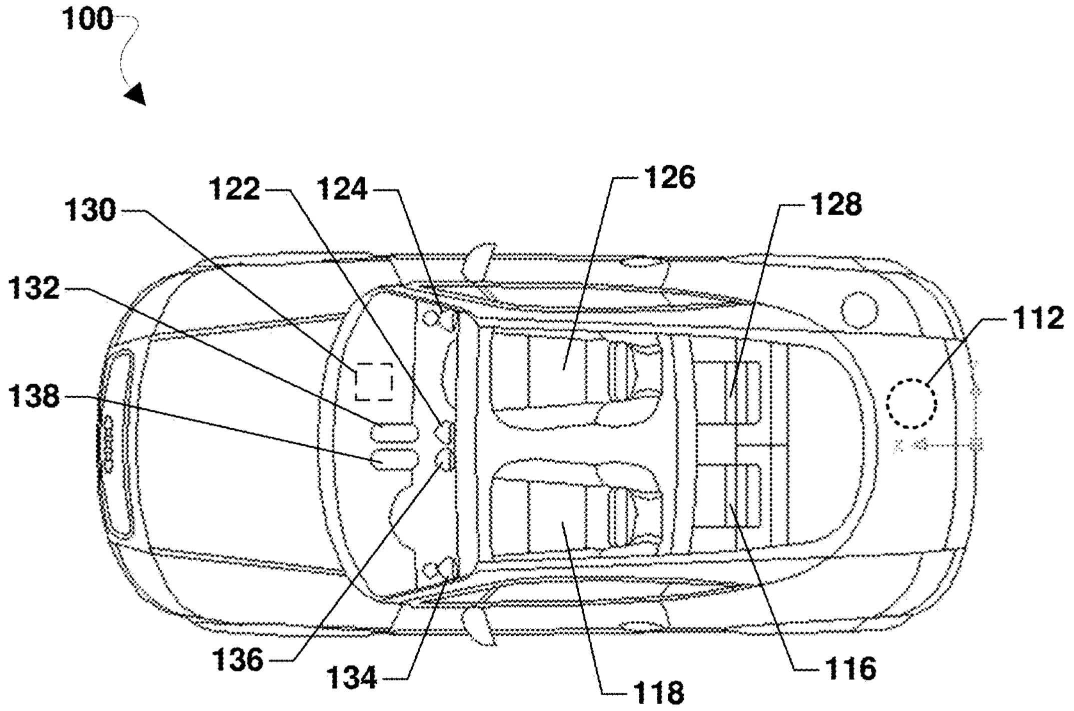

Various embodiments may be implemented within a variety of apparatuses, a non-limiting example of which in the form of a vehicle 100 is illustrated in FIGS. 1A and 1B. With reference to FIGS. 1A and 1B, a vehicle 100 may include a control unit 140, and a plurality of sensors 102-138, including satellite geopositioning system receivers 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation, collision avoidance, and autonomous and semi-autonomous navigation and control. Each of the sensors 102-138 may be in wired or wireless communication with a control unit 140, as well as with each other. In particular, the sensors may include one or more cameras 122, 136 or other optical sensors or photo optic sensors. Cameras 122, 136 or other optical sensors or photo optic sensors may include outward facing sensors imaging objects outside the vehicle 100 and/or in-vehicle sensors imaging objects (including passengers) inside the vehicle 100. In some embodiments, the number of cameras may be less than two cameras or greater than two cameras. For example, there may be more than two cameras, such as two frontal cameras with different fields of view (FOVs), four side cameras, and two rear cameras. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, hazardous material sensors, microphones 124, 134 (inside or outside the vehicle 100), occupancy sensors 112, 116, 118, 126, 128, proximity sensors, and other sensors.

The vehicle control unit 140 may be configured with processor-executable instructions to perform operations of some embodiments using information received from various sensors, particularly the cameras 122, 136. In some embodiments, the control unit 140 may supplement the processing of a plurality of images using distance and relative position (e.g., relative bearing angle) that may be obtained from radar 132 and/or lidar 138 sensors. The control unit 140 may further be configured to control steering, breaking and speed of the vehicle 100 when operating in an autonomous or semi-autonomous mode using information regarding other vehicles determined using methods of some embodiments. In some embodiments, the control unit 140 may be configured to operate as an autonomous driving system (ADS). In some embodiments, the control unit 140 may be configured to operate as an automated driver assistance system (ADAS).

Figure 1C:
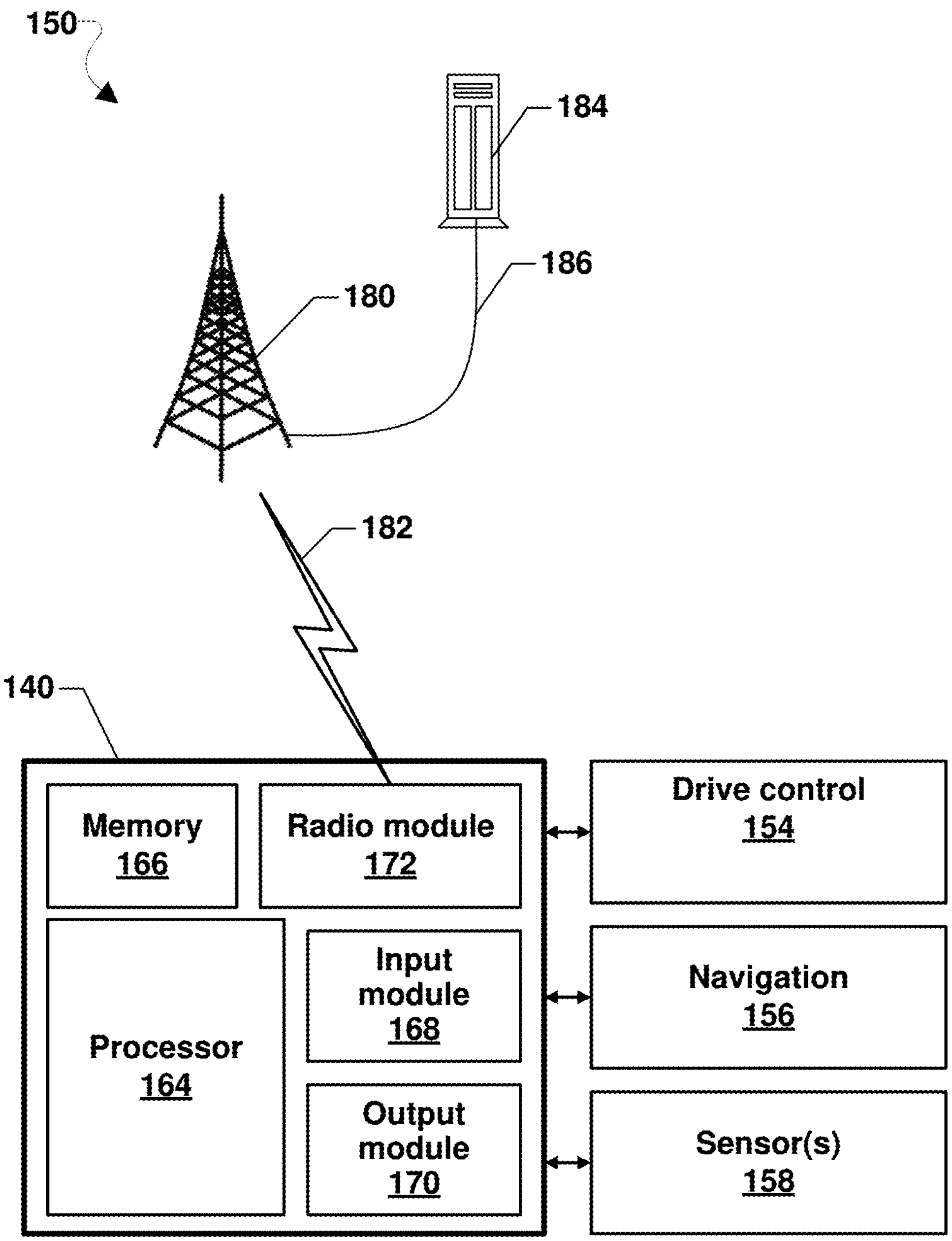

FIG. 1C is a component block diagram illustrating a system 150 of components and support systems suitable for implementing some embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100. The radio module 172 may be configured to communicate via wireless communication links 182 (e.g., 5G, etc.) with a base station 180 providing connectivity via a network 186 (e.g., the Internet) with a server 184 of a third party, such as a law enforcement of highway maintenance authority.

Figure 2:
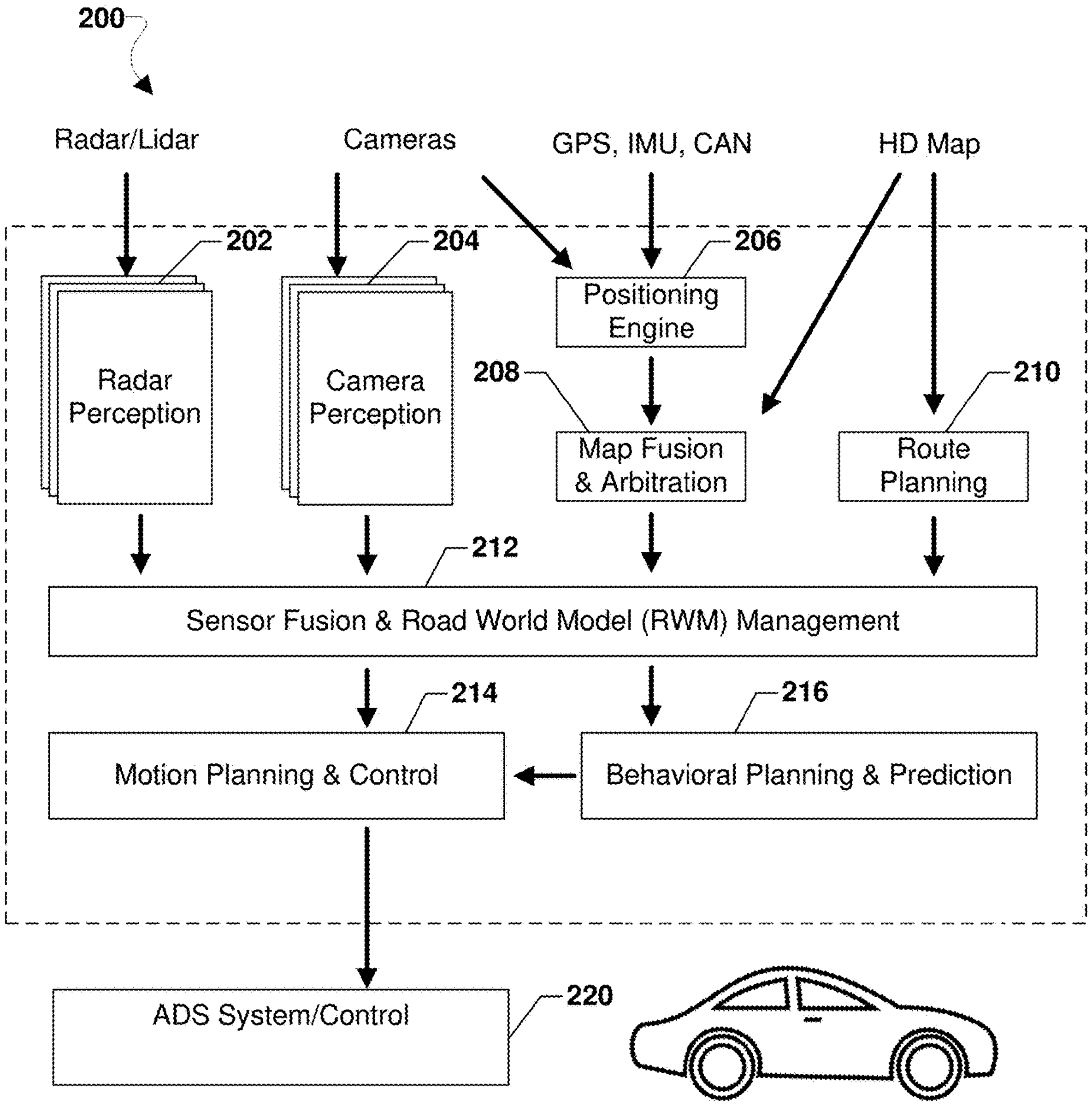
FIG. 2 is a functional block diagram showing functional elements or modules of an autonomous driving system suitable for implementing various embodiments.

FIG. 2 illustrates an example of subsystems, computational elements, computing devices, or units within a vehicle management system 200, which may be utilized within a vehicle 100. With reference to FIGS. 1A-2, in some embodiments, the various computational elements, computing devices or units within vehicle management system 200 may be implemented within a system of interconnected computing devices (i.e., subsystems), that communicate data and commands to each other (e.g., indicated by the arrows in FIG. 2). In other embodiments, the various computational elements, computing devices, or units within vehicle management system 200 may be implemented within a single computing device, such as separate threads, processes, algorithms, or computational elements. Therefore, each subsystem/computational element illustrated in FIG. 2 is also generally referred to herein as “module” that may be implemented in one or more processing systems that make up the vehicle management system 200. However, the use of the term module in describing various embodiments in not intended to imply or require that the corresponding functionality is implemented within a single autonomous (or semi-autonomous) vehicle management system computing device, in multiple computing systems, or a combination of dedicated hardware modules, software implemented modules and dedicated processing systems in a distributed vehicle computing system, although each are potential implementation embodiments. Rather, the use of the term “module” is intended to encompass subsystems with independent processing systems, computational elements (e.g., threads, algorithms, subroutines, etc.) running in one or more computing devices and processing systems, and combinations of subsystems and computational elements.

In various embodiments, the vehicle management system 200 may include a radar perception module 202, a camera perception module 204, a positioning engine module 206, a map fusion and arbitration module 208, a route planning module 210, sensor fusion and road world model (RWM) management module 212, motion planning and control module 214, and behavioral planning and prediction module 216. The modules 202-216 are merely examples of some modules in one example configuration of the vehicle management system 200. In other configurations consistent with some embodiments, other modules may be included, such as additional modules for other perception sensors (e.g., LIDAR perception module, etc.), additional modules for planning and/or control, additional modules for modeling, etc., and/or certain of the modules 202-216 may be excluded from the vehicle management system 200. Each of the modules 202-216 may exchange data, computational results, and commands with one another. Examples of some interactions between the modules 202-216 are illustrated by the arrows in FIG. 2. Further, the vehicle management system 200 may receive and process data from sensors (e.g., radar, lidar, cameras, inertial measurement units (IMU) etc.), navigation systems (e.g., global navigation satellite system (GNSS) receivers, IMUs, etc.), vehicle networks (e.g., Controller Area Network (CAN) bus), and databases in memory (e.g., digital map data). The vehicle management system 200 may output vehicle control commands or signals to the drive by wire (ADS) system/control unit 220, which is a system, subsystem or computing device that interfaces directly with vehicle steering, throttle, and brake controls. The configuration of the vehicle management system 200 and ADS system/control unit 220 illustrated in FIG. 2 is merely an example configuration and other configurations of a vehicle management system and other vehicle components may be used in some embodiments. As an example, the configuration of the vehicle management system 200 and ADS system/control unit 220 illustrated in FIG. 2 may be used in a vehicle configured for autonomous or semi-autonomous operation while a different configuration may be used in a non-autonomous vehicle.

The camera perception module 204 may receive data from one or more cameras, such as cameras (e.g., 122, 136), and process the data to recognize and determine locations of other vehicles and objects within a vicinity of the vehicle 100 and/or inside the vehicle 100 (e.g., passengers, etc.). The camera perception module 204 may include use of neural network processing and artificial intelligence methods to recognize objects and vehicles, and pass such information on to the sensor fusion and RWM trained model 212 and/or other modules, such as the augmented reality projection system/control unit 221.

The radar perception module 202 may receive data from one or more detection and ranging sensors, such as radar (e.g., 132) and/or lidar (e.g., 138), and process the data to recognize and determine locations of other vehicles and objects within a vicinity of the vehicle 100. The radar perception module 202 may include use of neural network processing and artificial intelligence methods to recognize objects and vehicles, and pass such information on to the sensor fusion and RWM trained model 212.

The positioning engine module 206 may receive data from various sensors and process the data to determine a position of the vehicle 100. The various sensors may include, but is not limited to, a GNSS sensor, an IMU, and/or other sensors connected via a CAN bus. The positioning engine module 206 may also utilize inputs from one or more cameras, such as cameras (e.g., 122, 136) and/or any other available sensor, such as radars, LIDARs, etc.

The map fusion and arbitration module 208 may access data within a high definition (HD) map database and receive output received from the positioning engine module 206 and process the data to further determine the position of the vehicle 100 within the map, such as location within a lane of traffic, position within a street map, etc. The HD map database may be stored in a memory (e.g., memory 166). For example, the map fusion and arbitration module 208 may convert latitude and longitude information from GNSS data into locations within a surface map of roads contained in the HD map database. GNSS position fixes include errors, so the map fusion and arbitration module 208 may function to determine a best guess location of the vehicle within a roadway based upon an arbitration between the GNSS coordinates and the HD map data. For example, while GNSS coordinates may place the vehicle near the middle of a two-lane road in the HD map, the map fusion and arbitration module 208 may determine from the direction of travel that the vehicle is most likely aligned with the travel lane consistent with the direction of travel. The map fusion and arbitration module 208 may pass map-based location information to the sensor fusion and RWM trained model 212.

The route planning module 210 may utilize the HD map, as well as inputs from an operator or dispatcher to plan a route to be followed by the vehicle 100 to a particular destination. The route planning module 210 may pass map-based location information to the sensor fusion and RWM trained model 212. However, the use of a prior map by other modules, such as the sensor fusion and RWM trained model 212, etc., is not required. For example, other processing systems may operate and/or control the vehicle based on perceptual data alone without a provided map, constructing lanes, boundaries, and the notion of a local map as perceptual data is received.

The sensor fusion and RWM trained model 212 may receive data and outputs produced by the radar perception module 202, camera perception module 204, map fusion and arbitration module 208, and route planning module 210, and use some or all of such inputs to estimate or refine the location and state of the vehicle 100 in relation to the road, other vehicles on the road, and other objects within a vicinity of the vehicle 100 and/or inside the vehicle 100. For example, the sensor fusion and RWM trained model 212 may combine imagery data from the camera perception module 204 with arbitrated map location information from the map fusion and arbitration module 208 to refine the determined position of the vehicle within a lane of traffic. As another example, the sensor fusion and RWM trained model 212 may combine object recognition and imagery data from the camera perception module 204 with object detection and ranging data from the radar perception module 202 to determine and refine the relative position of other vehicles and objects in the vicinity of the vehicle. As another example, the sensor fusion and RWM trained model 212 may receive information from vehicle-to-vehicle (V2V) communications (such as via the CAN bus) regarding other vehicle positions and directions of travel, and combine that information with information from the radar perception module 202 and the camera perception module 204 to refine the locations and motions of other vehicles. The sensor fusion and RWM trained model 212 may output refined location and state information of the vehicle 100, as well as refined location and state information of other vehicles and objects in the vicinity of the vehicle 100 or inside the vehicle 100, to the motion planning and control module 214, the behavior planning and prediction module 216, and/or the augmented reality projection system/control unit 221. As another example, the sensor fusion and RWM trained model 212 may apply facial recognition techniques to images to identify specific facial patterns inside and/or outside the vehicle.

As a further example, the sensor fusion and RWM trained model 212 may use dynamic traffic control instructions directing the vehicle 100 to change speed, lane, direction of travel, or other navigational element(s), and combine that information with other received information to determine refined location and state information. The sensor fusion and RWM trained model 212 may output the refined location and state information of the vehicle 100, as well as refined location and state information of other vehicles and objects in the vicinity of the vehicle 100 or inside the vehicle 100, to the motion planning and control module 214, the behavior planning and prediction module 216, the augmented reality projection system/control unit 221, and/or devices remote from the vehicle 100, such as a data server, other vehicles, etc., via wireless communications, such as through C-V2X connections, other wireless connections, etc.

As a still further example, the sensor fusion and RWM trained model 212 may monitor perception data from various sensors, such as perception data from a radar perception module 202, camera perception module 204, other perception module, etc., and/or data from one or more sensors themselves to analyze conditions in the vehicle sensor data. The sensor fusion and RWM trained model 212 may be configured to detect conditions in the sensor data, such as sensor measurements being at, above, or below a threshold, certain types of sensor measurements occurring (e.g., a seat position moving, a seat height changing, etc.), and may output the sensor data as part of the refined location and state information of the vehicle 100 provided to the behavior planning and prediction module 216, augmented reality projection system/control unit 221, and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction module 216 of the autonomous vehicle system 200 may use the refined location and state information of the vehicle 100 and location and state information of other vehicles and objects output from the sensor fusion and RWM trained model 212 to predict future behaviors of other vehicles and/or objects. For example, the behavioral planning and prediction module 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction module 216 may output other vehicle and object behavior and location predictions to the motion planning and control module 214. Additionally, the behavior planning and prediction module 216 may use object behavior in combination with location predictions to plan and generate control signals for controlling the motion of the vehicle 100. For example, based on route planning information, refined location in the roadway information, and relative locations and motions of other vehicles, the behavior planning and prediction module 216 may determine that the vehicle 100 needs to change lanes and accelerate, such as to maintain or achieve minimum spacing from other vehicles, and/or prepare for a turn or exit. As a result, the behavior planning and prediction module 216 may calculate or otherwise determine a steering angle for the wheels and a change to the throttle setting to be commanded to the motion planning and control module 214 and ADS system/control unit 220 along with such various parameters necessary to effectuate such a lane change and acceleration. One such parameter may be a computed steering wheel command angle.

The motion planning and control module 214 may receive data and information outputs from the sensor fusion and RWM trained model 212 and other vehicle and object behavior as well as location predictions from the behavior planning and prediction module 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control module 214 may verify and pass various control commands or instructions to the ADS system/control unit 220.

The ADS system/control unit 220 may receive the commands or instructions from the motion planning and control module 214 and translate such information into mechanical control signals for controlling wheel angle, brake, and throttle of the vehicle 100. For example, ADS system/control unit 220 may respond to the computed steering wheel command angle by sending corresponding control signals to the steering wheel controller.

The ADS system/control unit 220 may receive data and information outputs from the motion planning and control module 214 and/or other modules in the vehicle management system 200, and based on the received data and information outputs determine whether an event a decision maker in the vehicle 100 is to be notified about is occurring.

In some embodiments, the vehicle management system 200 may include functionality that performs safety checks or oversight of various commands, planning or other decisions of various modules that could impact vehicle and occupant safety. Such safety check or oversight functionality may be implemented within a dedicated module or distributed among various modules and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter (s), and issue a warning or command if the safety parameter is or will be violated. For example, a safety or oversight function in the behavior planning and prediction module 216 (or in a separate module) may determine the current or future separate distance between another vehicle (as may be refined by the sensor fusion and RWM trained model 212) and the vehicle (e.g., based on the world model refined by the sensor fusion and RWM trained model 212), compare that separation distance to a safe separation distance parameter stored in memory, and issue instructions to the motion planning and control module 214 to speed up, slow down or turn if the current or predicted separation distance violates the safe separation distance parameter.

Figure 3:
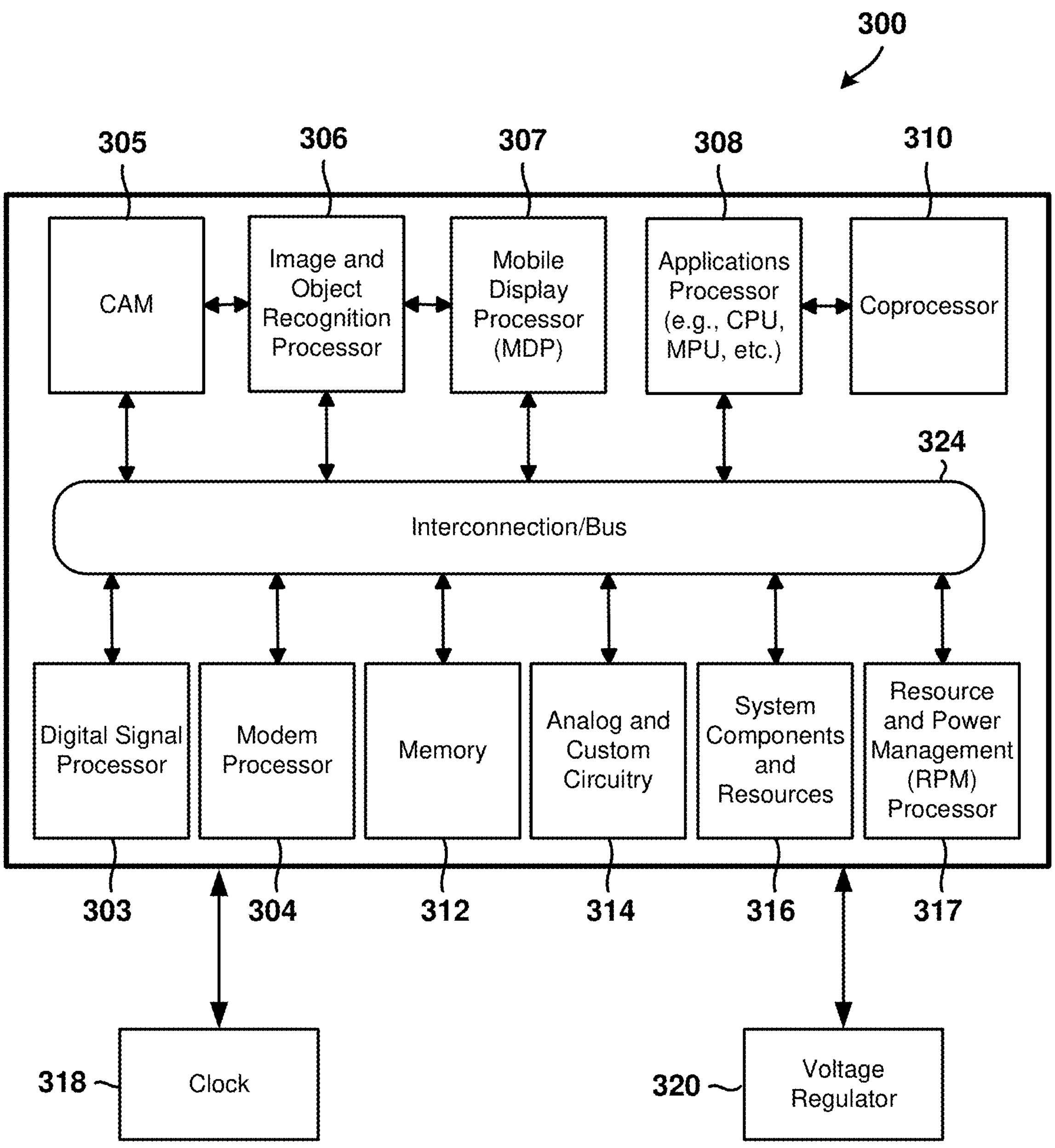
FIG. 3 is a component block diagram of a processing system suitable for implementing various embodiments.

FIG. 3 is a block diagram illustrating an example components of a system on chip (SOC) 300 for use in a processing system (e.g., a V2X processing system) in accordance with various embodiments. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317.

Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles. In some embodiments, the processor 306 may be configured to process radar or lidar data.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, Wi-Fi, etc.), and other well-known components of modern electronic devices.

Figure 4:
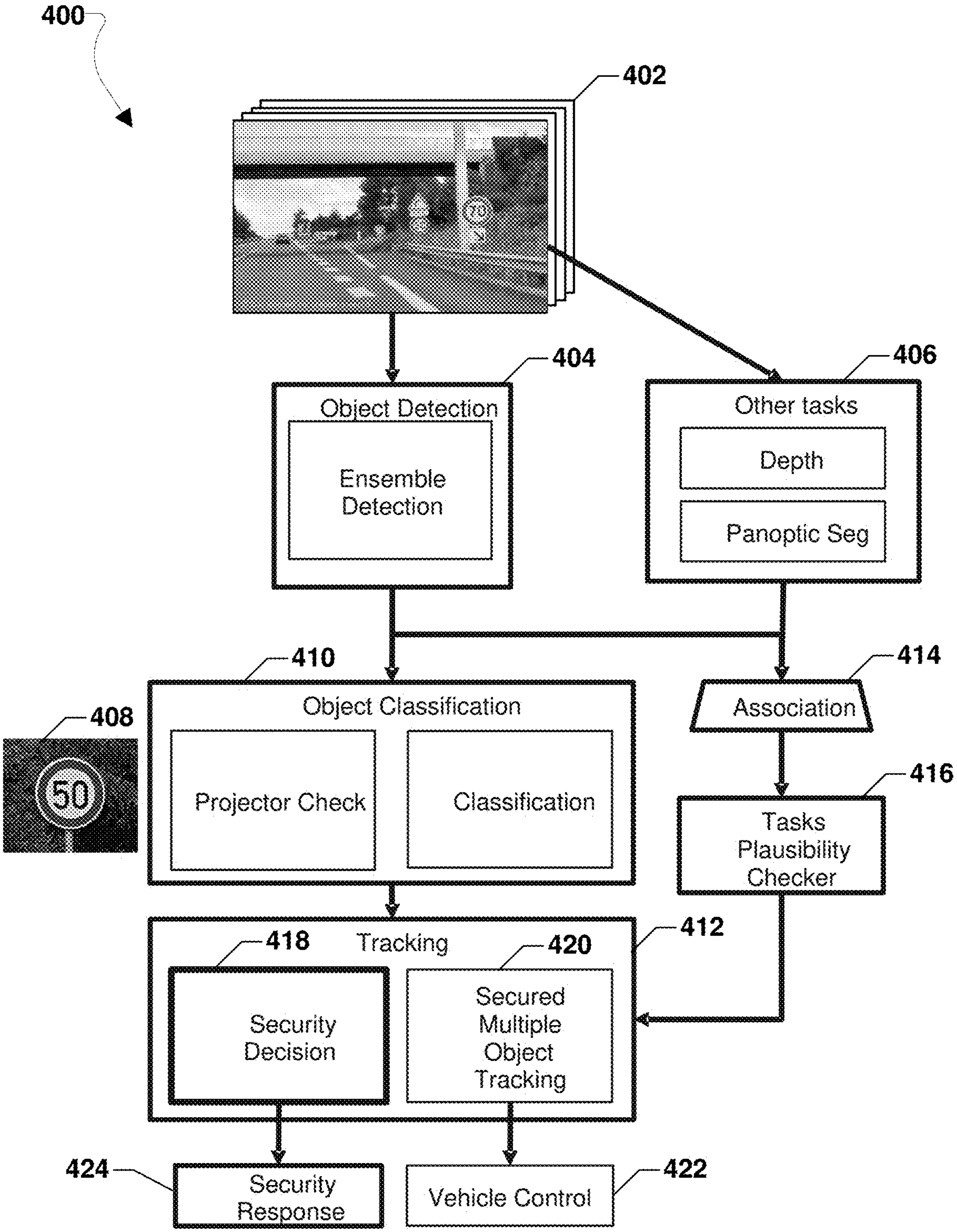
FIG. 4 a processing block diagram illustrating various operations that are performed on a plurality of images as part of an autonomous driving system as well as implementing operations involved in various embodiments.

FIG. 4 a processing block diagram illustrating various operations that are performed on images as part of an autonomous driving system as well as implementing operations involved in various embodiments. With reference to FIGS. 1A-4 image frames 402 from multiple apparatus cameras may be received by an image processing system, such as a camera perception module 204, which may include multiple modules, processing systems and trained machine model/AI modules configured to perform various operations required to obtain from the images the information necessary to support vehicle navigation and safe operations. While not meaning to be inclusive, FIG. 4 illustrates some of the processing that is involved in supporting autonomous vehicle operations as well as recognizing vision attacks and taking mitigating actions according to various embodiments.

Image frames 402 may be processed by an object detection module 404 that performs operations associated with detecting objects within the image frames based on a variety of image processing techniques. As discussed, autonomous vehicle image processing involves multiple detection methods and analysis modules that focus on different aspects of using image streams to provide the information needed by autonomous driving systems to navigate safely. The processing of image frames in the object detection module 404 may involve a number of different detectors and modules that process images in different ways in order to recognize objects, define bounding blocks encompassing objects, and identifying locations of detected objects within the frame coordinates. The outputs of various detection methods may be combined in an ensemble detection, which may be a list, table or data structure of the detections by individual detectors processing image frames. Thus, ensemble detection in the object detection module 404 may bring together outputs of the various detection mechanisms and modules for use in object classification tracking and vehicle control decision-making.

Also as discussed, image processing supporting autonomous driving systems involve other image processing tasks 406. As an example of other tasks, image frames may be analyzed to determine the 3D depth of roadway features and detected objects. Other processing tasks 406 may include panoptic segmentation, which is a computer vision task that includes both instance segmentation and semantic segmentation. Instance segmentation involves identifying and classifying multiple categories of objects observed within image frames. Semantic segmentation is the task of associating individual pixels or groups of pixels in a digital image with a class or classification label, such as "trees," "traffic sign," "pedestrian," "roadway," "building," "car," "sky," etc. By solving both instance segmentation and semantic segmentation problems together, panoptic segmentation enables a more detailed understanding by the autonomous driving system of a given scene.

The outputs of object detection methods 404 and other tasks 406 may be used in object classification 410. As described, this may involve classifying features and objects that are detected in the image frames using classifications that are important to autonomous driving system decision-making processes (e.g., roadway features, traffic signs, pedestrians, other vehicles, etc.). As illustrated, recognized features, such as a traffic sign 408 in a segment or bounding box within an image frame, may be examined using methods described herein to assign a classification to individual objects as well as obtain information regarding the object or feature (e.g., the speed limit is 50 kilometers per hour per the recognized traffic sign 408). Also as part of object classification 410, checks may be made of image frames to look for projection attacks using techniques described herein.

Outputs of the other tasks 406 may also be analyzed for associations of features and elements from one frame to the next in operations 414. As described further herein, such associations may be part of recognizing inconsistencies in images that could be indicative of a camera or vision attack. Also, such associations may be useful in determining whether various tasks are plausible in operations 416.

Outputs of the object classification 410 may be used in tracking 412 various features and objects from one frame to the next. As described above, tracking of features and objects is important for identifying the trajectory of features/objects relative to the vehicle for purposes of navigation and collision avoidance. Thus, the tracking operations 412 may result in providing secured multiple object tracking 420 to support the vehicle control function 422 of an autonomous driving system. Additionally, feature/object tracking may be used in some embodiment methods for detecting inconsistencies that may be indicative or suggestive of a vision attack. Thus, the operations of tracking 412 may be used in making security decisions 418 that may be used to trigger or define a security response 424, such as one or more responses to mitigate the risks or effects of a vision attack.

Figure 5:
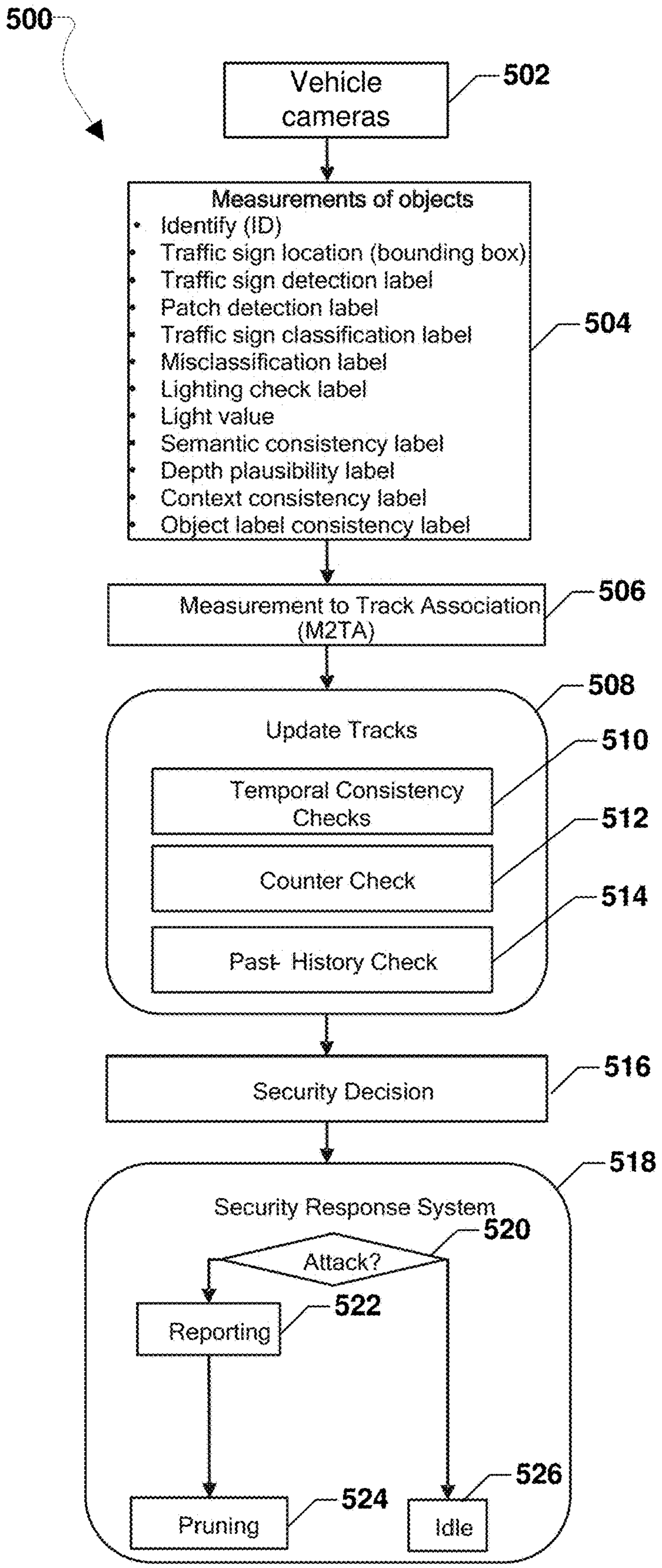
FIG. 5 is a block diagram of operations that may be performed as part of validating object detection and recognizing vision attacks in accordance with various embodiments.

FIG. 5 is a functional block diagram that illustrates operations 500 of various embodiments. As described, vehicle cameras 502 may provide pluralities of images (such as a stream of image frames from one or more cameras) to various image processing modules, processing systems, and AI modules that recognize, identify and measure various objects within image frames. Such measurements may include identifying features and objects and assigning identifiers (ID) to recognized features, objects (or bounding boxes around such elements) within image frames. As an example, measurements of objects may include identifying traffic signs within images, such as enclosing the signs within a bounding box with identified coordinates (e.g., pixel coordinates) within the images, and labeling detected traffic signs (e.g., a label that includes a classification of the detected traffic sign). Measurements of objects may also include assigning labels to patches that are detected in the images (e.g., features that look like traffic signs, pedestrians or cars but are actually two-dimensional images and the like). Measurements may further include assigning misclassification labels, lighting check labels, light values, semantic consistency labels, depth plausibility labels, context consistency labels, an object label consistency labels, all of which may then be used in consistency checks for purposes of identifying inconsistencies in and across image frames that may indicate or suggest a vision attack.

These measurements 504 may be associated with tracks spanning multiple image frames in block 506. That is, individual features/objects and the associated labels identified in block 504 may be tracked across a series of image frames to identify the trajectory of the labeled features/objects with respect to the vehicle. In block 508, this information may be used to update tracks and perform multiple analyses to detect vision attacks or inconsistencies suggestive or indicative of vision attacks. Such tests or detectors may include temporal consistency checks 510, consistency counter checks 512 and past history checks 514. The results of these analyses may then be processed together to make a security decision in block 516. The output of the security decision may be an appropriate security response in block 518. For example, a decision may be whether there is an attack determination block 520. If a decision is made that an attack is present, the attack may be reported to an authority in block 522 and actions may be taken to protect the vehicle, such as pruning 524 suspicious information from the data used in operating the vehicle. If a decision is made that there is no attack present, the security response system may remain idle in block 526.

Figure 6:
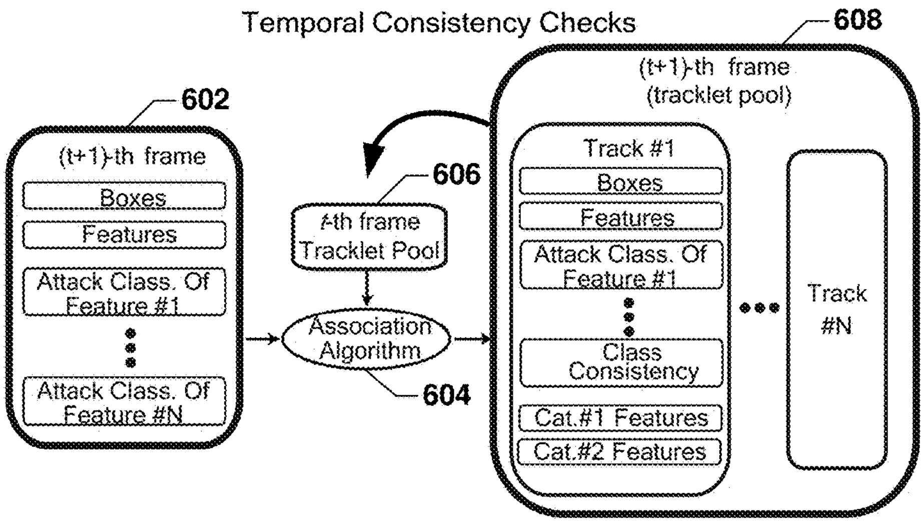
FIG. 6 is a block diagram illustrating operations and data structures involved in performing temporal consistency checks in accordance with some embodiments.

FIG. 6 is a block diagram illustrating operations and data structures involved in the performance of temporal consistency checks for recognizing potential vision attacks based upon inconsistencies of features are objects from one frame to the next in accordance with some embodiments. With reference to FIG. 1A-6, temporal consistency checks may be configured to detect temporal inconsistencies in values and/or classifications between two consecutive or sequential frames on an object, feature or track basis.

Referring to FIG. 6, measurements of features and objects (e.g., measurements 504) may be considered together in a data structure for a given image frame (e.g., the (t+1)-th frame) that includes measurements for the boxes, classifications, and attack classifications for each of the identified features (e.g., #1 to #N). These measurements 602 in each frame may be processed in an association algorithm 604 with the values in a previous frame 606 (e.g., a t-th frame) to enable tracking of a given feature or object from one frame to the next, which may be stored in a tracklet pool data structure 608 that includes the box, feature, pack classification, feature categorization of multiple tracks as well as keeping track of a class consistency from frame to frame leading. This process of associating boxes features classifications etc. from frame to frame and building a tracklet pool data structure across multiple tracks may enable identifying inconsistencies from one frame to another across various tracks through an extended sequence of image frames.

The temporal consistency checks may be performed look for changes between two consecutive frames that are inconsistent with reality for a given feature or object. To be sensitive to a variety of attack methodologies that may attempt to spoof cameras and other imaging devices, and/or image processing, the detection method (or detector) may evaluate features/objects according multiple measurements or factors across multiple image frames. So instead of just considering a label assigned to a feature/object from one frame to the next, the detection method may also evaluate other measurements or values, individually or collectively. The detection method may determine whether the feature change from one frame to another, such as in size, shape, location, classification, and does so in a manner that is inconsistent with reality (e.g., moves too fast, changes shape in an unnatural way, etc.).

Temporal consistency checks may be performed as a function of two or more values (e.g., Value A, Value B) of features/objects between two image frames, such as a whether a difference between the two values exceeds a threshold of natural or expected changes, and thus indicative of an attack. In equation form, this could be represented as: |Value A−Value B|>Threshold, in which Value A and Value B are the value of the feature from image (t) and the one from track (t−1). The values Value A, Value B, and Threshold may be floating point values, vectors, or matrices. This function may return a binary output such as inconsistent if the difference exceeds the threshold or consistent if the difference <=threshold. Temporal Consistency Feature may keep track of multiple characteristics of features of an identify object. May be a list of the function output after each successful association cycle. For example, a temporal consistency feature may include inconsistency values across multiple times or image frames (e.g., consistent (t−2), inconsistent (t−1), inconsistent (t).

As an example, temporal consistency checks may determine whether a bounding box moves or is displaced by more than a threshold amount from one frame to the next, such as indicating movement that is unnatural or beyond the capacity of the classification assigned to that object or box. For example, a traffic sign will not move in reality and thus its movement from frame to frame is bounded by the relative movement that can be expected based upon the vehicle's own velocity. As another example, a pedestrian may move from frame to frame based on relative movement with respect to the vehicle plus the pedestrian's own walking or running speed, which will be bounded by a threshold value. If an object or bounding box around an object moves from frame to frame at a rate indicative of an unrealistic velocity, this is an indication of an inconsistency that could be evidence of a vision attack. Other dynamic features that may be compared to a threshold include variation in color (e.g., color shifts occur at a rate greater than expected for natural things), variations in illumination, and variations in depth within the field of view.

Other types of changes may also be indicative of a vision attack, such as abnormal value changes for non-security features, or changes in values that are expected be static, such as a change of a traffic sign detection label, change of the traffic sign classification label, or change of semantic label from one frame to the next.

Temporal consistency classifications may include two categories of checks and features. The first category, abnormal value changes for non-security features may be tracked, such as a change in a label or a classification assigned to a given feature or object (e.g., a traffic sign). This first category may distinguish between static features, which are not expected to move from one frame to the next, and dynamic features which can be expected to move, and thus may be compared to movement or velocity thresholds in addition to other considerations. The second category involves changes of attack classification, which may monitor the output from an attack classifier within the image processing systems. For example, temporal consistency classifications this category may include tracking inconsistent outputs from a projector detector and inconsistent outputs from a patch detector.

The threshold applied in temporal consistency checks is important because small changes, particularly in terms of location frame to frame, are to be expected. Using a threshold test enables the temporal consistency check detector to avoid a false detection based upon normal movements or changes in a particular object or feature.

Figure 7:
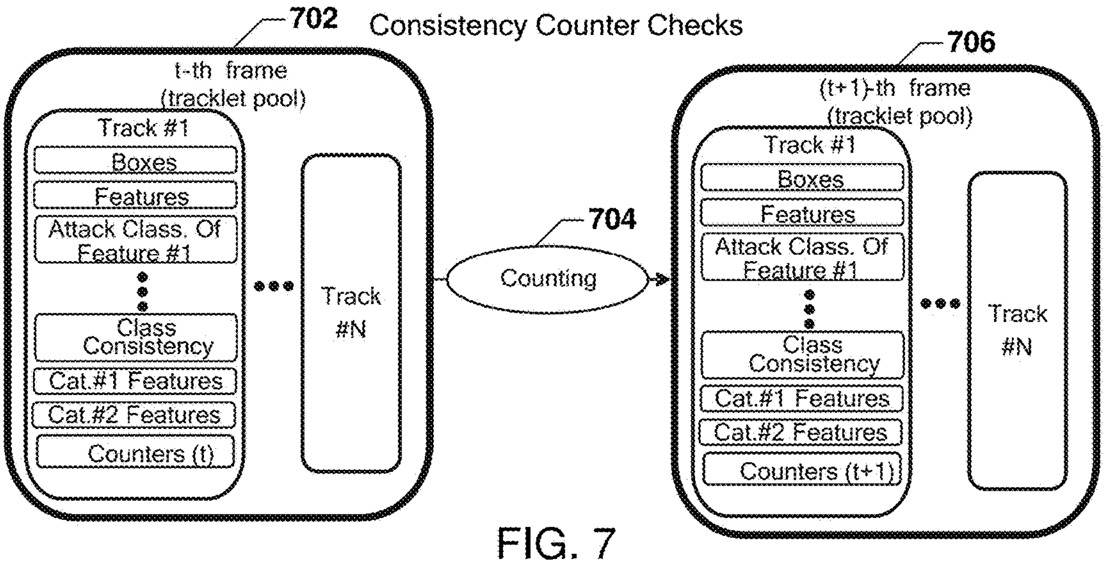
FIG. 7 is a block diagram illustrating operations and data structures involved in performing consistency counter checks in accordance with some embodiments.

FIG. 7 is a block diagram illustrating operations and data structures involved in performing inconsistency counter checks in accordance with some embodiments. Different kinds of attacks and different causes of inconsistencies from one image frame to the next may involve a form of noise that can be accounted for by keeping track or counting the number of inconsistencies within a given track. For example, a patch or projector attack may be a consistent noise in that the patch remains on a traffic sign for the whole detection process, while the effects of a patch are not always stable, which could lead to misclassification. On the other hand, sun glare or natural objects moving through a frame, such as a leaf falling in front of the vehicle, may provoke a misclassification of an object by securing the object or interfering with images of the object temporarily. By keeping track of the number or account of inconsistencies within a given track, non-attack inconsistencies are likely to have a smaller count across a plurality of image frames then would be the case for a vision attack which is more likely to continue for the whole period of observation.

With reference to FIG. 1A-7, consistency counter checks may involve comparing various values for boxes, features, classifications etc. within a first frame (e.g., a t-th frame) tracklet pool 702 to corresponding values in a subsequent frame (e.g., a (t+1)-th frame) using a counting function 704. As illustrated, each of the frame tracklet pool data structures 702, 706 may include a data field for the count at the corresponding time. Over a number of frames if the counter for a given inconsistency exceeds a threshold, this may be indicative of a vision attack. The count check may be applied to each feature and object that was identified and tracked in the temporal consistency checks described with reference to FIG. 6. If the same inconsistency appears in subsequent frame tracklet pool, the counter in the subsequent tracklet pool for that feature may be incremented.

A suitable threshold for recognizing various types of potential vision attacks may be by recording different types of image frame-to-frame inconsistencies that are observed during a series of non-adversarial road tests (i.e., road test in which it is know that there are no vision attacks present). Thus, the number may be based on the maximum number of inconsistencies that are seen during the longest lifetime of light track related to an object during normal driving conditions when there is no threat present the threshold number may change based upon the classification of the object or feature. For example, a larger threshold may be appropriate for images of other vehicles (which move a present a collision hazard) than for a traffic sign (which is stationary and located off the roadway).

Figure 8:
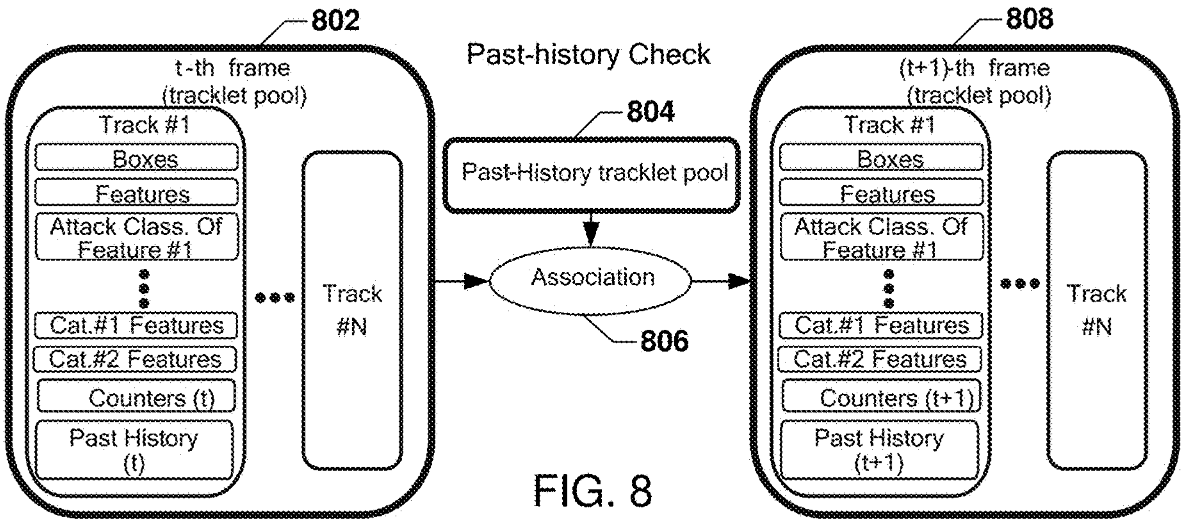
FIG. 8 is a block diagram illustrating operations and data structures involved in performing past history checks in accordance with some embodiments.

FIG. 8 is a block diagram illustrating operations and data structures involved in performing past history checks in accordance with some embodiments. Another check can be performed for detecting vision attacks is whether there is an unexpected change between an object or feature that has been observed in the past (e.g., when the vehicle has driven the same route on previous days) and an observed object or feature. For example, frequent (e.g., daily) travels between home and work or other common destinations may enable building up a database of frequently observed objects or features that are always tracked, such as traffic signs, traffic lights, etc. If the same object is observed over many such trips then can be assumed that these objects are features are permanent and should be observed every time. However, if a common feature for object is suddenly missing, this inconsistency between the current track and past tracks regarding a normally fixed object (e.g., traffic signs, traffic lights, etc.) may be indicative of a vision attack that needs to be evaluated. Consideration may be given to differences in distance or viewing perspective when determining whether there has been a change between past tracks and the current track.

As illustrated in FIG. 8, past-history checks may be supported by adding a past history value or tag to features and objects stored in frame tracklet pool data structures 802, 808. For example, the past history value at time t in the t-th frame tracklet pool 802 may be associated with a past-history tracklet pool 804 via an association function 806, and response to confirming an association of a particular object or feature, a past history value or tag may be updated in the next frame (e.g., (t+1)-th frame) tracklet pool. This association and updating may be performed on a per object/feature and per track basis as illustrated.

Figure 9:
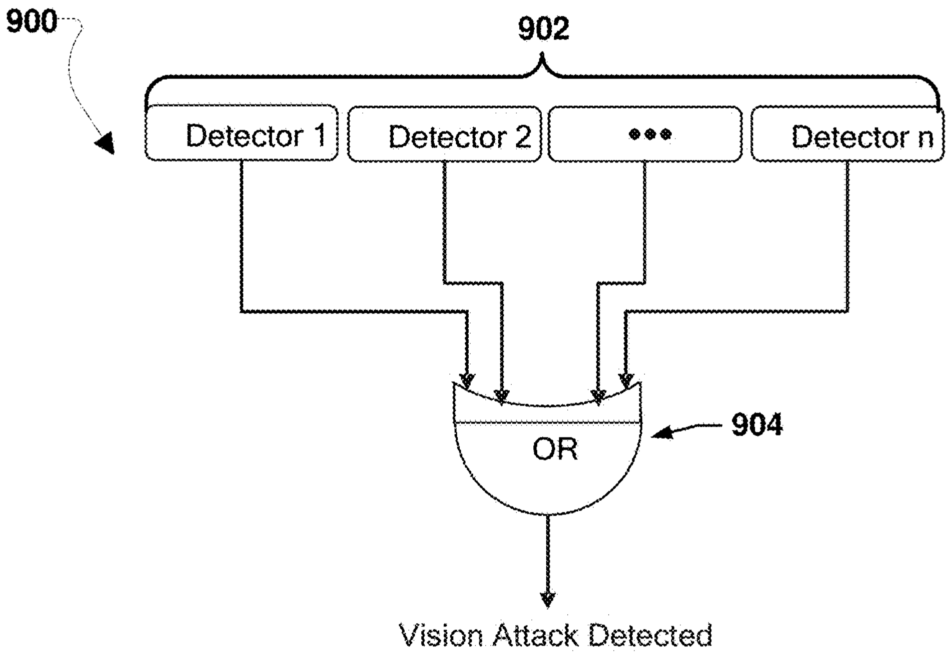
FIGS. 9-11 are diagrams of alternative decision algorithms for recognizing potential attacks on apparatus cameras based on multiple detection methods according to some embodiments.
Figure 10:
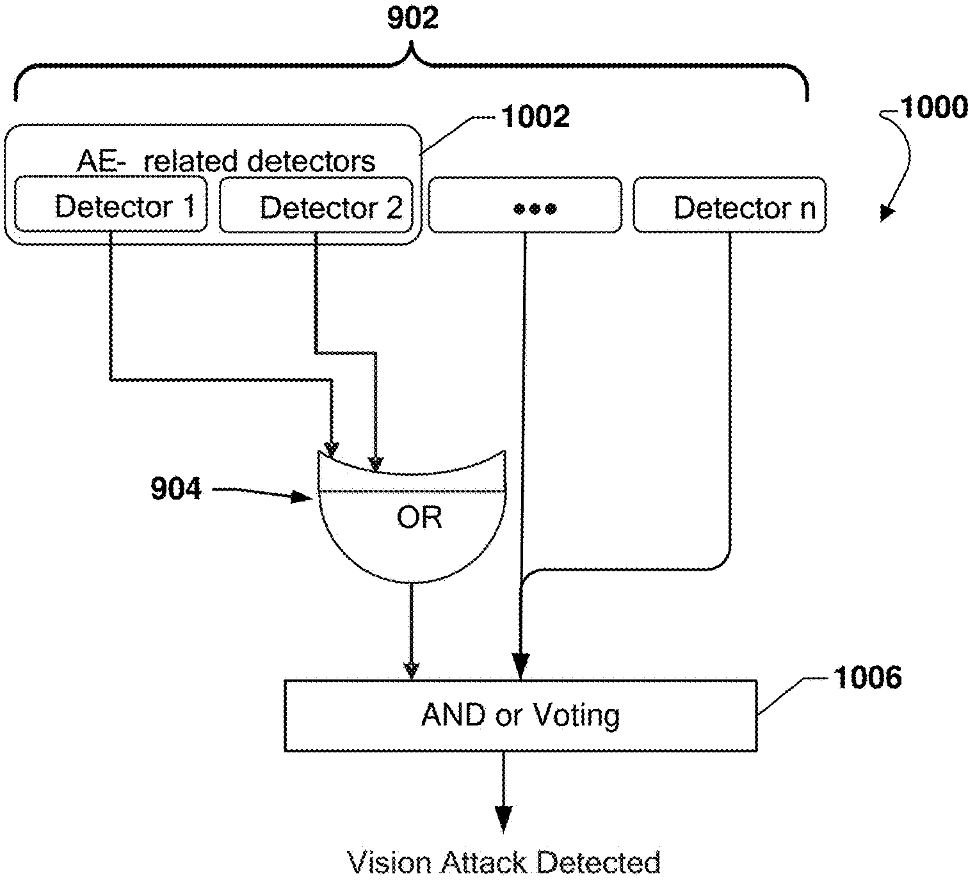
Figure 11:
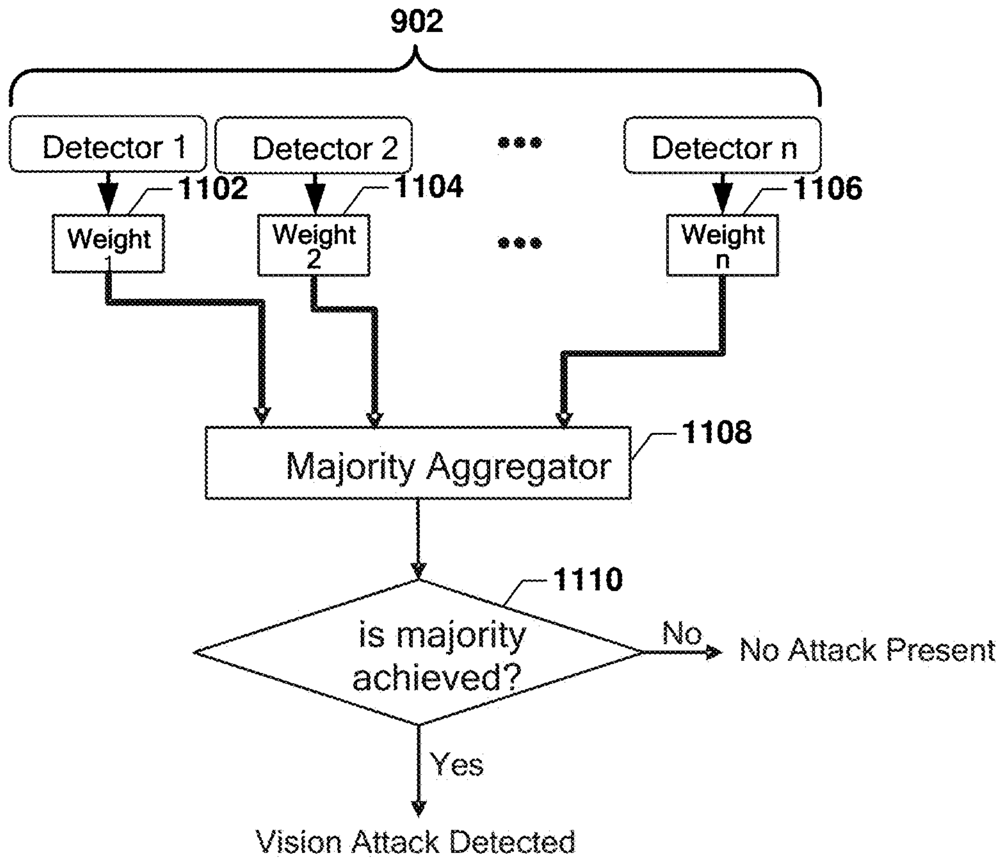

FIGS. 9-11 are diagrams of alternative decision algorithms for recognizing potential attacks on vehicle cameras based on multiple detection methods according to some embodiments. With reference to FIGS. 1A-11, the inconsistencies recognized in each of the temporal, inconsistency counter, and past-history checks described above may be used in a decision making test or algorithm executing in a processing system. The decision test or algorithm may depend upon the desired or appropriate level of sensitivity and tolerance or acceptability of false positive decisions. In the description of these figures a detector may be detection criteria (e.g., a function) that depends on a counter value and its threshold value. In each of the decision tests or algorithms, some detectors may be deactivated or ignored depending on operating circumstances, such as during harsh weather (e.g., rain, fog, or snow) when images may be distorted or affected by natural phenomenon.

As illustrated in FIG. 9, a simple decision test 900 may be that a vision attack is recognized or suspected if any one of multiple detection methods or detectors 902 indicate (e.g., output an indication of) an actual or possible attack. As illustrated, the outputs or conclusions of multiple detectors 902 are accumulated in an OR function 904 so that any positive detector output (e.g., a detector detects an image inconsistency) results in a decision that a vision attack is present. Thus, a single triggered detector (i.e., a single detector detecting an image inconsistency) is sufficient to reach a decision that an attack is present or likely.

As illustrated in FIG. 10, in some decision test or algorithms 1000 the OR function may be applied to some detectors 1002 but not all detectors 902, such as those detectors that are more reliable (e.g., have lower false-positive rates) or associated with more hazardous attacks, while the outputs of other detectors may be evaluated based on voting or AND functions 1006.

As illustrated in FIG. 11, in some embodiments the decision test or algorithms recognition that a vision attack is present may be determined based on a voting of all of the active detectors 902, such as using a majority aggregator 1108. If a majority (or unanimous) vote is achieved (i.e., a majority of detectors detect an image inconsistency) (e.g., in determination block 1110), then a vision attack may be detected, but if not then a determination may be made that no attack is present. FIG. 11 also illustrates that the output of each detector may be weighted or adjusted by a weighting factor 1102, 1104, 1106 associated with or appropriate for each type of detector 902 or detection method. In this embodiment, the majority aggregator 1108 may aggregate the weighted scores and the determination of majority in determination block 1110 may be whether the total exceeds a threshold value (i.e., a weighted total of detectors detecting image inconsistencies).

Figure 12:
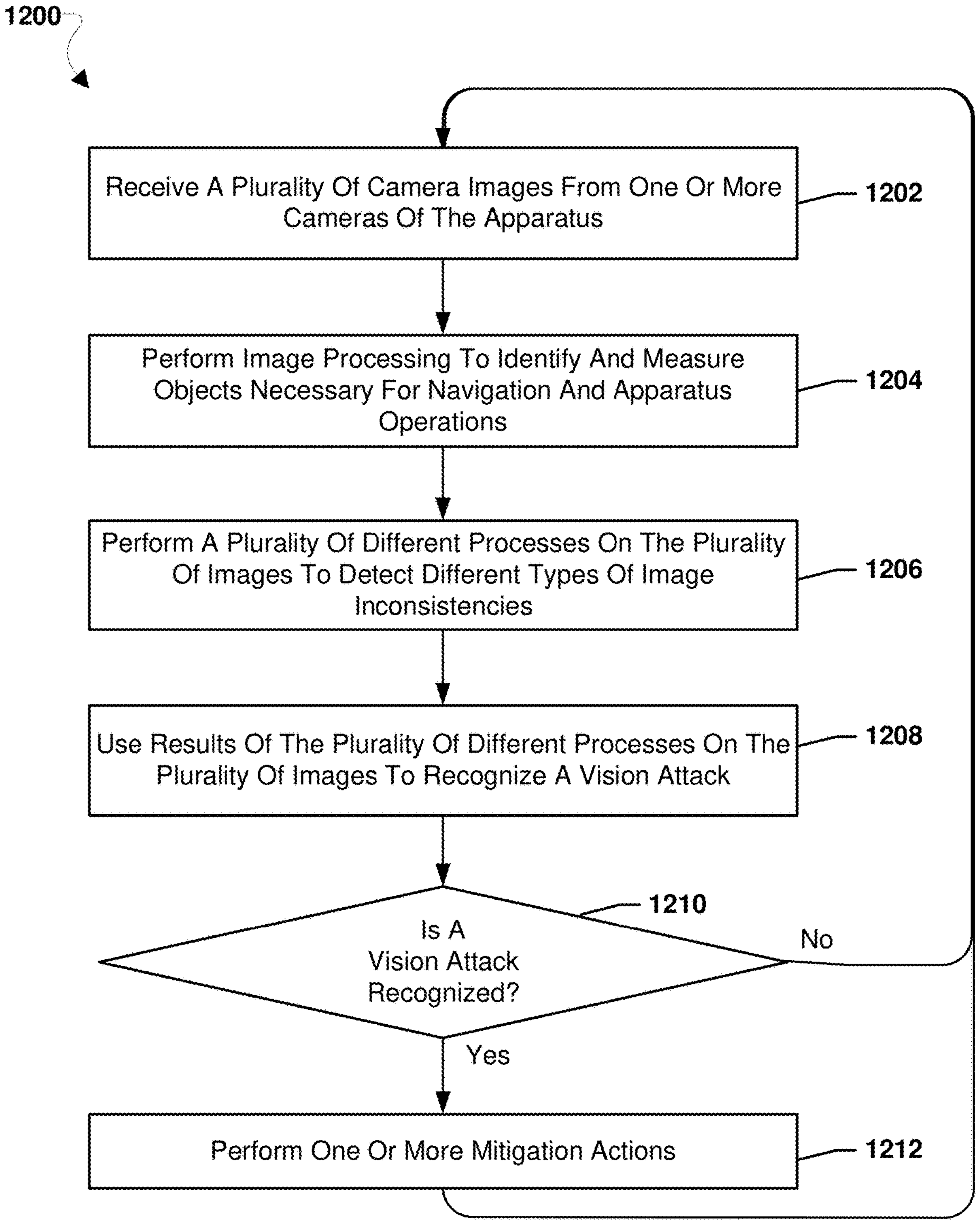
FIG. 12 is a process flow diagram of an example method of processing a plurality of images for recognizing a vision attack or potential vision attack in accordance with some embodiments.

FIG. 12 is a process flow diagram of an example method 1200 for validating object detections and image inconsistencies performed by a processing system on an apparatus (e.g., a vehicle) for detecting and reacting to potential attacks on apparatus camera systems in accordance with various embodiments. With reference to FIGS. 1A-12, the operations of the method 1200 may be performed by a processing system (e.g., 102, 120, 240) including one or more processors (e.g., 110, 123, 124, 126, 127, 128, 130) and/or hardware elements, any one or combination of which may be configured to perform any of the operations of the method 12. Further, one or more processors within the processing system may be configured with software or firmware to perform various operations of the method. To encompass any of the processor(s), hardware elements and software elements that may be involved in performing the method 1200, the elements performing method operations are referred to as a "processing system." Further, means for performing functions of the method 1200 may include the processing system (e.g., 102, 120, 240) including one or more processors (e.g., 110, 123, 124, 126, 127, 128, 130), memory 112, a radio module 118, and/or vehicle sensors (e.g., 122, 136).

In block 1202, the processing system may perform operations including receiving a plurality of images (such as but not limited to stream of camera image frames) from one or more cameras of the apparatus (e.g., a vehicle). For example, a plurality of image frames may be received from one or more forward facing cameras used for observing the road ahead for navigation and collision avoidance purposes.

In block 1204, the processing system may perform operations including performing image processing to identify and measure objects necessary for navigation and apparatus operations. As described, camera plurality of images may be processed by a number of different processing systems, including trained neural network processing systems to extract information that is necessary to safely navigate the apparatus. As described, these operations may include identifying and measuring objects in the environment including identifying objects both as objects and as the type of objects, identifying traffic signs and categorizing or classifying the traffic sign and detecting the outlines and depth of the roadway. Image processing operations may further include identifying objects that need to be avoided, which may include classifying recognized objects. Further image processing that may be performed as part of the operations in block 1204 may include assigning a lighting check label, determining the lighting or lighting values, performing semantic consistency checks on identified objects, performing depth plausibility analysis and labeling such objects, performing context consistency analysis and providing labels accordingly, and checking the consistency of object labels. Such operations may also include associating the various object measurements with the current vehicle track and object tracks (i.e., measurement to track association).

In block 1206, the processing system may perform operations including a plurality of different processes performed on the plurality of images to detect different types of image inconsistencies. Performing more than one different process for recognizing image inconsistencies may provide better detection sensitivity as well as reduced false alarm events. As described with reference to FIG. 13, the different processes may include temporal consistency checks on detected objects and their classifications, inconsistency counter checks to recognize when a number of image inconsistencies exceeds a threshold indicative of a potential attack on vehicle cameras, and past history checks to recognize when commonly observed objects suddenly move, change, or disappear.

In block 1208, the processing system may perform operations including using results of the plurality of different processes on the plurality of images to recognize a vision attack. In block 1208, the result of the various checks performed in block 1206 may be used in a decision algorithm to recognize whether an attack on vehicle cameras is happening or likely. As described, such decision algorithms may be as simple as a recognizing a vision attack if any one of the different inconsistency check processes indicates the potential for contact. More sophisticated algorithms may include assigning a weight to each of the various inconsistency detection methods (referred to herein as "detectors") and accumulating the result in a voting or threshold algorithm to decide whether a vision attack is more likely than not.

In determination block 1210, the processing system may perform operations including determining whether a vision attack has been recognized or is likely based on the analyses performed in blocks 1206 and 1208.

In response to determining that a vision attack has been recognized or is likely (i.e., determination block 1210="Yes"), the processing system may perform operations including performing one or more mitigation actions in block 1212. In some embodiments, the mitigation actions may include ignoring, pruning, or removing a malicious track (or potentially malicious track or object) from a tracking database by the vehicle ADS or disabling or otherwise ignoring a malicious feature associated with an object identified in the images. In some embodiments, the mitigation action may include reporting the detected attack to a remote system, such as a law-enforcement authority or highway maintenance organization so that the threat or cause of the malicious attack can be stopped or removed. In some embodiments, the mitigation action may include outputting an indication of the vision attack, such as a warning or notification to an operator.

The operations in the method 1200 may be performed continuously. Thus, in response to determining that an attack in one or more cameras has not been recognized (i.e., determination block 1210="No") and after taking 1212, the processing system may repeat the method 1200 by again receiving a plurality of images from the one or more apparatus cameras in block 1202 and performing the method as described.

Figure 13:
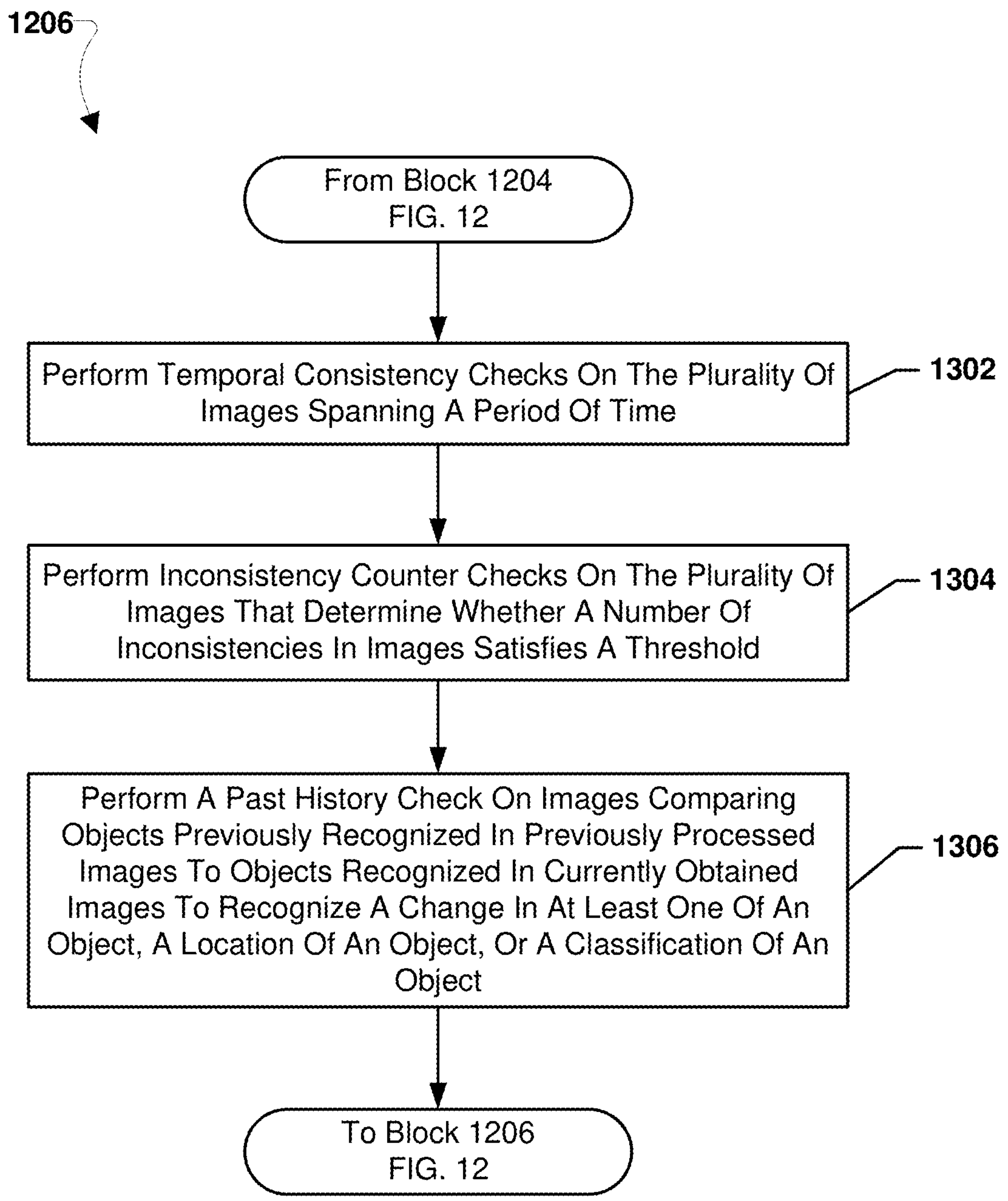
FIG. 13 is a process flow diagram of example operations that may be performed as part of recognizing a vision attack or potential vision attack in a plurality of images in accordance with some embodiments.

FIG. 13 is a process flow diagram of example operations 1206 that may be performed as part of the method 1200 for performing a plurality of different processes on the plurality of images to detect different types of image inconsistencies in accordance with various embodiments. With reference to FIGS. 1A-13, the operations 1206 may be performed by a processing system (e.g., 102, 120, 240) including one or more processors (e.g., 110, 123, 124, 126, 127, 128, 130) and/or hardware elements, any one or combination of which may be configured to perform any of the operations. Further, one or more processors within the processing system may be configured with software or firmware to perform various operations. To encompass any of the processor(s), hardware elements and software elements that may be involved in performing the illustrated operations, the elements performing method operations are referred to as a "processing system." Further, means for performing functions of the illustrated operations may include the processing system (e.g., 102, 120, 240) including one or more processors (e.g., 110, 123, 124, 126, 127, 128, 130), memory 112, and/or vehicle cameras (e.g., 122, 136).

After image processing of the plurality of images has been performed in block 1204 of the method 1200, the processing system may perform operations including performing temporal consistency checks on the plurality of images spanning a period of time in block 1302. As described, the operations in block 1302 may include image frame-to-frame comparisons configured to detect temporal inconsistencies in values and/or classifications between two consecutive or sequential frames on an object, feature or track basis. Measurements performed on each image frame may be associated with objects, labels and/or values in a previous image frame enable tracking of features, objects, labels, classifications, and values from one frame to the next. The processes in block 1302 may enable identifying inconsistencies from one frame to another across various tracks through an extended sequence of image frames. In some embodiments, the processes in block 1302 may include tracking inconsistent outputs from a projector detector and inconsistent outputs from a patch detector.

In block 1304, the processing system may perform operations including performing inconsistency counter checks on the plurality of image that determine whether a number of inconsistencies in image frames satisfies a threshold. In some embodiments, the processes in block 1304 may include counting image inconsistency events and determining whether the count of a given inconsistency exceeds a threshold that may be indicative of a vision attack. This count check performed in block 1304 may be applied to each feature and object that was identified and tracked in the temporal consistency checks in blocks 1302.

In block 1306, the processing system may perform operations including performing a past history check on the plurality of images comparing objects previously recognized in previously processed images to objects recognized in currently obtained images to recognize a change in at least one of an object, a location of an object, or a classification of an object. In some embodiments, the processes in block 1306 may include determining whether there is an unexpected change between an object or feature that has been observed in the past (e.g., when the vehicle has driven the same route on previous days) and an observed object or feature. An unexpected change may be movement or disappearance of an object that has a permanent classification, such as a traffic sign or roadway feature, or the appearance of an object with a permanent classification that was not present previously.

Implementation examples are described in the following paragraphs. While some of the following implementation examples are described in terms of example systems and methods, further example implementations may include: the example operations discussed in the following paragraphs may be implemented by various computing devices; the example methods discussed in the following paragraphs implemented by an apparatus computing device including a processing system including one or more processors configured with processor-executable instructions to perform operations of the methods of the following implementation examples; the example methods discussed in the following paragraphs implemented by an apparatus computing device including means for performing functions of the methods of the following implementation examples; and the example methods discussed in the following paragraphs may be implemented as a non-transitory processor-readable storage medium having stored thereon processor-executable instructions configured to cause a processing system of an apparatus computing device to perform the operations of the methods of the following implementation examples.

Example 1. A method for detecting vision attacks performed by a processing system on an apparatus, the method including: receiving a plurality of images from one or more cameras of the apparatus; performing a plurality of different processes on the plurality of images to detect different types of image inconsistencies; using results of the plurality of different processes on the plurality of images to recognize a vision attack; and performing one or more mitigation actions in response to recognizing the vision attack.

Example 2. The method of example 1, in which performing the plurality of different processes on the plurality of images to detect different types of image inconsistencies includes performing temporal consistency checks on images spanning a period of time.

Example 3. The method of any of examples 1-2, in which performing the plurality of different processes on the plurality of images to detect different types of image inconsistencies includes performing inconsistency counter checks on the plurality of images that determine whether a number of inconsistencies in images satisfies a threshold.

Example 4. The method of any of examples 1-3, in which performing the plurality of different processes on the plurality of images to detect different types of image inconsistencies includes performing a past history check on the plurality of images comparing objects previously recognized in previously processed images to objects recognized in currently obtained images to recognize a change in at least one of an object, a location of an object, or a classification of an object.

Example 5. The method of any of examples 1-4, in which using results of the plurality of different processes on the plurality of images includes one or more of: recognizing a vision attack if any one of the different types of image inconsistencies is detected; recognizing a vision attack if a number of the different types of image inconsistencies that are detected exceeds a threshold; recognizing a vision attack if a majority of the detectors detect image inconsistencies; or recognizing a vision attack if a weighted majority of detectors detect image inconsistencies, in which weights applied to each of the detectors are predetermined.

Example 6. The method of any of examples 1-5, in which performing a mitigation action in response to recognizing a vision attack includes one or more of removing a malicious track from a tracking database, outputting an indication of the vision attack, or disabling a malicious feature associated with an object identified in the camera images.

Example 7. The method of any of examples 1-6, in which performing a mitigation action in response to recognizing a vision attack includes reporting the detected attack to a remote system.

Example 8. The method of any of examples 1-7, in which the apparatus is a vehicle.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments for reporting detections of vision attacks on an apparatus. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 400*a*-400*c* may be substituted for or combined with one or more operations of the methods and operations 400*a*-400*c*.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular. In addition, reference to the term "and/or" should be understood to include both the conjunctive and the disjunctive. For example, "A and/or B" means "A and B" as well as "A or B."

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processing system may perform operations including be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for detecting vision attacks performed by a processing system on an apparatus, the method comprising:

receiving images from one or more cameras of the apparatus;

performing semantic segmentation on the images to detect one or more objects;

associating the detected one or more objects with one or more tracks between the images;

performing a plurality of different processes on the images, the detected one or more objects, and the one or more tracks to detect different types of image inconsistencies;

determining a vision attack on the one or more cameras based on detecting at least one type of image inconsistency in the images; and performing one or more mitigation actions in response to determining the vision attack.

2. The method of claim 1, wherein performing the plurality of different processes on the images to detect the different types of the image inconsistencies comprises performing temporal consistency checks on the images spanning a period of time.

3. The method of claim 1, wherein performing the plurality of different processes on the images to detect the different types of the image inconsistencies comprises performing inconsistency counter checks on the images that determine whether a number of inconsistencies in the images satisfies a threshold.

4. The method of claim 1, wherein performing the plurality of different processes on the images to detect the different types of the image inconsistencies comprises performing a past history check on the images comparing objects previously recognized in previously processed images to objects recognized in the images to recognize a change in at least one of an object, a location of the object, or a classification of the object.

5. The method of claim 1, wherein determining the vision attack comprises one or more of:

recognizing a vision attack if any one of the different types of the image inconsistencies is detected;

recognizing a vision attack if a number of the different types of the image inconsistencies that are detected exceeds a threshold;

recognizing a vision attack if a majority of detectors detect the image inconsistencies; or recognizing a vision attack if a weighted majority of detectors detect the image inconsistencies, wherein weights applied to each of the detectors are predetermined.

6. The method of claim 1, wherein performing a mitigation action in response to determining a vision attack comprises one or more of removing a malicious track from a tracking database, outputting an indication of the vision attack, or disabling a malicious feature associated with an object identified in the images.

7. The method of claim 1, wherein performing a mitigation action in response to determining the vision attack comprises reporting the vision attack to a remote system.

8. The method of claim 1, wherein the apparatus is a vehicle.

9. An apparatus, comprising:

one or more memories; and a processing system coupled to the one or more memories, and including one or more processors configured to:

receive images from one or more cameras;

perform semantic segmentation on the images to detect one or more objects;

associate the detected one or more objects with one or more tracks between the images;

perform a plurality of different processes on the images, the detected one or more objects, and the one or more tracks to detect different types of image inconsistencies;

determine a vision attack on the one or more cameras based on detecting at least one type of image inconsistency in the images; and perform one or more mitigation actions in response to determining the vision attack.

10. The apparatus of claim 9, wherein the one or more processors are further configured to perform temporal consistency checks on the images spanning a period of time.

11. The apparatus of claim 9, wherein the one or more processors are further configured to perform inconsistency counter checks on the images, wherein the inconsistency counter checks determine whether a number of inconsistencies in the images satisfies a threshold.

12. The apparatus of claim 9, wherein the one or more processors are further configured to perform a past history check on the images comparing objects previously recognized in previously processed images to objects recognized in the images to recognize a change in at least one of an object, a location of the object, or a classification of the object.

13. The apparatus of claim 9, wherein to determine the vision attack, the one or more processors are further configured to:

recognize a vision attack if any one or more detectors detect the image inconsistencies;

recognize a vision attack if a number of the different types of the image inconsistencies that are detected exceeds a threshold;

recognize a vision attack if a majority of the different types of the image inconsistencies are detected; or recognize a vision attack if a weighted majority of different detectors detect the image inconsistencies, wherein weights applied to each of the one or more detectors are predetermined.

14. The apparatus of claim 9, wherein the one or more processors are further configured to perform a mitigation action in response to determining a vision attack, wherein the mitigation action includes one or more of removing a malicious track from a tracking database or disabling a malicious feature associated with an object identified in the images.

15. The apparatus of claim 9, wherein the one or more processors are further configured to perform a mitigation action in response to determining a vision attack, wherein the mitigation action includes reporting the vision attack to a remote system.

16. The apparatus of claim 9, wherein the apparatus is a vehicle.

17. A non-transitory processor-readable medium having stored thereon processor-executable instructions configured to cause a processing system of an apparatus to:

receive images from one or more cameras of the apparatus;

perform semantic segmentation on the images to detect one or more objects;

associate the detected one or more objects with one or more tracks between the images;

perform a plurality of different processes on the images, the detected one or more objects, and the one or more tracks to detect different types of image inconsistencies;

determine a vision attack on the one or more cameras based on detecting at least one type of image inconsistency in the images; and perform one or more mitigation actions in response to determining a vision attack.

18. The non-transitory processor-readable medium of claim 17, wherein the stored processor-executable instructions are further configured to cause the processing system to perform temporal consistency checks on the images spanning a period of time.

19. The non-transitory processor-readable medium of claim 17, wherein the stored processor-executable instructions are further configured to cause the processing system to perform inconsistency counter checks on the images that determine whether a number of inconsistencies in the images satisfies a threshold.

20. The non-transitory processor-readable medium of claim 17, wherein the stored processor-executable instructions are further configured to cause the processing system of the apparatus to perform a past history check on the images comparing objects previously recognized in previously processed images to objects recognized in currently obtained images to recognize a change in at least one of an object, a location of the object, or a classification of the object.

21. The non-transitory processor-readable medium of claim 17, wherein to determine the vision attack, the stored processor-executable instructions are further configured to cause the processing system to use results of the plurality of different processes on the images to:

recognize a vision attack if any one of the different types of the image inconsistencies is detected;

recognize a vision attack if a number of the different types of the image inconsistencies that are detected exceeds a threshold;

recognize a vision attack if a majority of detectors detect the image inconsistencies; or recognize a vision attack if a weighted majority of detectors detect the image inconsistencies, wherein weights applied to each detector are predetermined.

22. The non-transitory processor-readable medium of claim 17, wherein the stored processor-executable instructions are further configured to cause a processing system of an apparatus to perform a mitigation action in response to determining the vision attack, wherein the mitigation action includes one or more of removing a malicious track from a tracking database, outputting an indication of the vision attack, or disabling a malicious feature associated with an object identified in the images.

23. The non-transitory processor-readable medium of claim 17, wherein the stored processor-executable instructions are further configured to cause a processing system of an apparatus to perform a mitigation action in response to determining the vision attack, wherein the mitigation action includes reporting the vision attack to a remote system.

* * * * *